US007577301B1

(12) United States Patent
Wu et al.

(10) Patent No.: US 7,577,301 B1
(45) Date of Patent: Aug. 18, 2009

(54) MULTIPLE PAGE DESCRIPTIONS FOR THE SAME PAGE

(75) Inventors: Kok G. Wu, Daly City, CA (US); Martin Boliek, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 785 days.

(21) Appl. No.: 10/404,271

(22) Filed: Mar. 31, 2003

Related U.S. Application Data

(60) Provisional application No. 60/433,296, filed on Dec. 13, 2002.

(51) Int. Cl.
*G06K 9/36* (2006.01)
(52) U.S. Cl. .................. 382/233; 382/240
(58) Field of Classification Search ............ 382/173, 382/232, 233, 245, 302, 240; 707/1, 102
See application file for complete search history.

(56) References Cited

U.S. PATENT DOCUMENTS

2002/0091665 A1* 7/2002 Beek et al. ................. 707/1

OTHER PUBLICATIONS

W.P. Pennebaker, et al. "JPEG Still Image Compression Standard". Chapter 1-14, Published 1993.
D.S. Taubman, et al. "JPEG 2000 Image Coding System". 226 pages, Published Aug. 18, 2000.

* cited by examiner

*Primary Examiner*—Duy M Dang
(74) *Attorney, Agent, or Firm*—Blakely, Sokoloff, Taylor & Zafman LLP

(57) ABSTRACT

A method and apparatus for using multiple page descriptions for the same page is described. In one embodiment, the method comprises receiving a file in a file format, wherein the file has a plurality of page boxes for a page, each of the plurality of page boxes corresponding to a different description of the page; and accessing the file to obtain at least one of the different descriptions of the page.

57 Claims, 18 Drawing Sheets

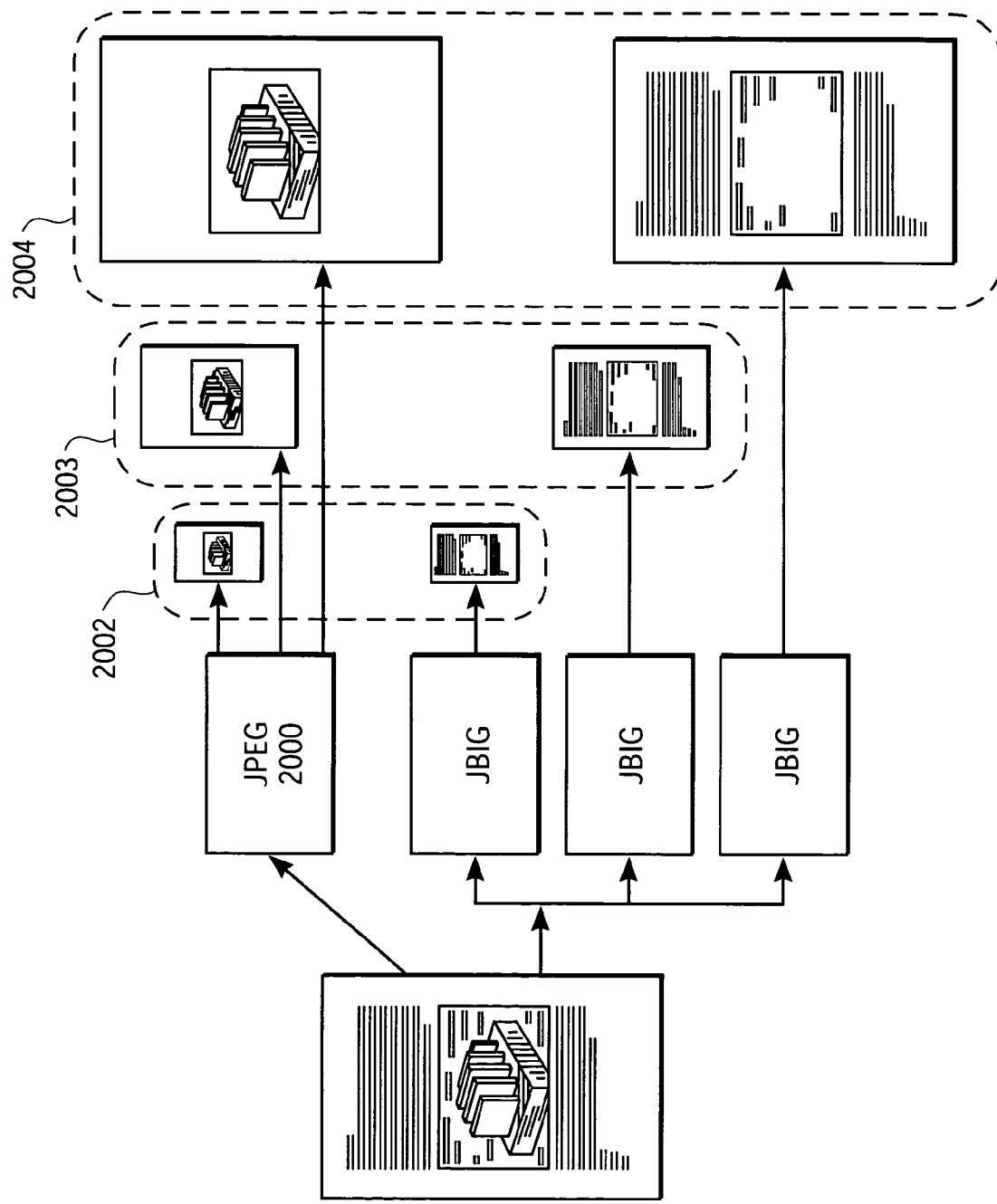

Mask Divided Into Multiple Codestreams

MULTIPLE PAGE DESCRIPTIONS FOR THE SAME PAGE

This Application claims the benefit of U.S. Provisional Application No. 60/433,296 entitled "JPEG 2000-Like Access Using the JPM Compound Document File Format," filed Dec. 13, 2002.

FIELD OF THE INVENTION

The present invention relates to the field of file formats; more particularly, the present invention relates to accessing coded data using specific file formats.

BACKGROUND

Documents often include not only text, but color graphics and imagery. These are often referred to as compound documents. Magazines, newspapers, brochures and annual reports have had these attributes for a long time. With the popularity of desktop publishing, color scanners, color printers, color copiers and color digital cameras for the consumer and office markets, the ability to make use of color, graphics and imagery in documents is now commonplace.

There are various compressors for specific image types. These include fax compression technologies such as G3, G4, MMR, and JBIG. Other well-known compression technologies include JPEG.

Some compressors can handle portions of these document efficiently based on their data types. However, many of these compressors cannot handle compound documents well. For example, binary compressors, such as JBIG, provide excellent compression for text that can be characterized as binary. However, such compressors, including the traditional facsimile compression technologies (G3, G4, MMR, JBIG), are insufficient for color images or even grayscale. Similarly, continuous tone compressors like, for example, JPEG, are better natural images with little high frequency information yet wide dynamic range JPEG (see W. P. Pennebaker, J. L. Mitchell, *JPEG: Still Image Compression Standard*, Van Nostrand Reinhold, 1993) or JPEG 2000 (see "Information Technology—JPEG 2000 Image Coding Standard," *ITU-T Rec. T.800|IS* 15444-1, December 2000 and D. S. Taubman, M. W. Marcellin, JPEG 2000 Image Compression Fundamentals, Standards, and Practice, Kluwer Academic Publishers, Boston, 2002). However, JPEG does not provide a lossless representation and is not so efficient for sharp edges created by text.

Furthermore, none of these technologies discussed above allows access of lower resolution, progression from lossy to lossless, or access to regions-of-interest. This access is useful for delivering document images from databases or capture devices, to different target devices such as computer and PDA displays, and printers.

JPEG 2000 is a state-of-the-art continuous-tone image coding system. Based on wavelet transform technology followed by bit-plane coding, JPEG 2000 generally provides better rate-distortion performance than the original discrete cosine transform based JPEG coding system. However, the real advantages of JPEG 2000 are the access of different resolutions, progressive bit-rates from very lossy to lossless, access to regions-of-interest, and access to color components. Although JPEG 2000 is capable of reasonable lossless performance on binary images, it is not as good as a dedicated binary image compressor like JBIG or JBIG-2.

Many have been working on the problem of determining how a page image should be segmented for the best rate-distortion. For example, see D. Mukherjee, C. Chrysafis, "JPEG 2000-Matched MRC Compression of Compound Documents" *Proc. Int. Conf on Image Processing*, Rochester, N.Y., September 2002; R. L. de Queiroz, Z. Fan, T. D. Tran, "Optimizing Block-Thresholding Segmentation for Multilayer Compression of Compound Images," *IEEE Trans. on Image Processing*, Vol. 9, No. 9, pp. 1461-71, September 2000; and L. Bottou, P. Haffner, Y. LeCun, "Efficient Conversion of Digital Documents to Multilayer Raster Formats," *Int. Conf Doc. Analysis and Recognition*, Seattle, Wash., pp. 444-48, September 2001.

JPM is a new standard file format that has been designed to address these problems. The JPM file format (JPEG Mixed Raster Content) is Part 6 of the JPEG 2000 standard. See "Information Technology—JPEG 2000 Image Coding Standard—Part 6: Compound Image File Format," ISO/IEC FDIS 15444-6. The JPM standard is a file format that specifies multiple page collections and pages, multiple objects with object images, mask (binary or alpha), location, scale, and order, and background color. The algorithms and implementations for the encoder include how to segment the image into objects, which of a variety of image compressors to use for each object, while how to construct the objects is left unspecified for the encoder. FIG. 1A shows an example of some of the elements of a JPM file.

JPM enables the segmentation of document images into images that are better compressed by different standard image compressors. For example, text and graphic images with high frequency information but little dynamic range are best compressed with a binary coder such as Group 4 ("Facsimile coding schemes and coding control functions for group 4 facsimile apparatus," ITU-T Rec. T.6, November 1998), or JBIG ("Information Technology—Coded representation of picture and audio information—Progressive bi-level image compression," ITU-T Rec. T.82, March 1995), or JBIG-2 ("Information Technology—Lossy/Lossless coding of bi-level images," ITU-T Rec. T.88, February 2000).

JPM has three key advantages. First, it allows JPEG 2000 coder use. Second, it allows multiple pages and collections of pages to be contained, or referenced, in a single file. Third, it enables a compressed masked imaging system. Called "layout objects", they contain a "mask," "image," and attributes such as order (with respect to other objects), scale, position, and cropping (or extent). These layout objects are merged together to form the final "page" image. FIG. 1B shows an example of the merging of JPM objects with image and mask elements.

JPM is considered by some to be a descendent from the Mixed Raster Content file format often used for Internet-based facsimile. See "Mixed Raster Content (MRC)," ITU-T Rec. T.44, Study Group-8 Contributions, 1998. Mixed Raster Content was standardized as ITU-T Rec. T.44 ("Mixed Raster Content (MRC)," ITU-T Rec. T.44, Study Group-8 Contributions, 1998). This standard was used in the IETF facsimile standard ("File Format for Internet Fax," IETF FRC 2301, March 1998) and Xerox's Digipaper product (see D. Huttenlocher, P. Felzenszwalb, W. Ruckidge, "Digipaper: A Versatile Color Document Image Representation," *Proc. Int. Conf. on Image Processing*, Kobe, Japan, October 1999).

Another related technology that preceded JPM is DjVu (see L. Bottou, et. al., "High Quality Document Image Compression with DjVu," *J. Electronic Imaging*, pp. 410-25, July 1998). This technology is similar to, but not compliant with, Mixed Raster Content. However, it does take advantage of wavelet technology for continuous-tone coding. Another related technology is Scalable Vector Graphics (SVG) standardized by the W3C. This technology provides multiple resolutions for objects, but limited options for raster content.

SUMMARY OF THE INVENTION

A method and apparatus for using multiple page descriptions for the same page is described. In one embodiment, the method comprises receiving a file in a file format, wherein the file has a plurality of page boxes for a page, each of the plurality of page boxes corresponding to a different description of the page; and accessing the file to obtain at least one of the different descriptions of the page.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2A illustrates a redundant binary mask for resolution progression.

FIG. 3A illustrates tiled binary masks for region-of-interest access.

FIG. 5 illustrates exemplary metadata for a compact index representation of a shared data entry box.

FIG. 6 illustrates another exemplary metadata for a compact index representation of a shared data entry box.

DETAILED DESCRIPTION OF THE PRESENT INVENTION

Figure 1A:
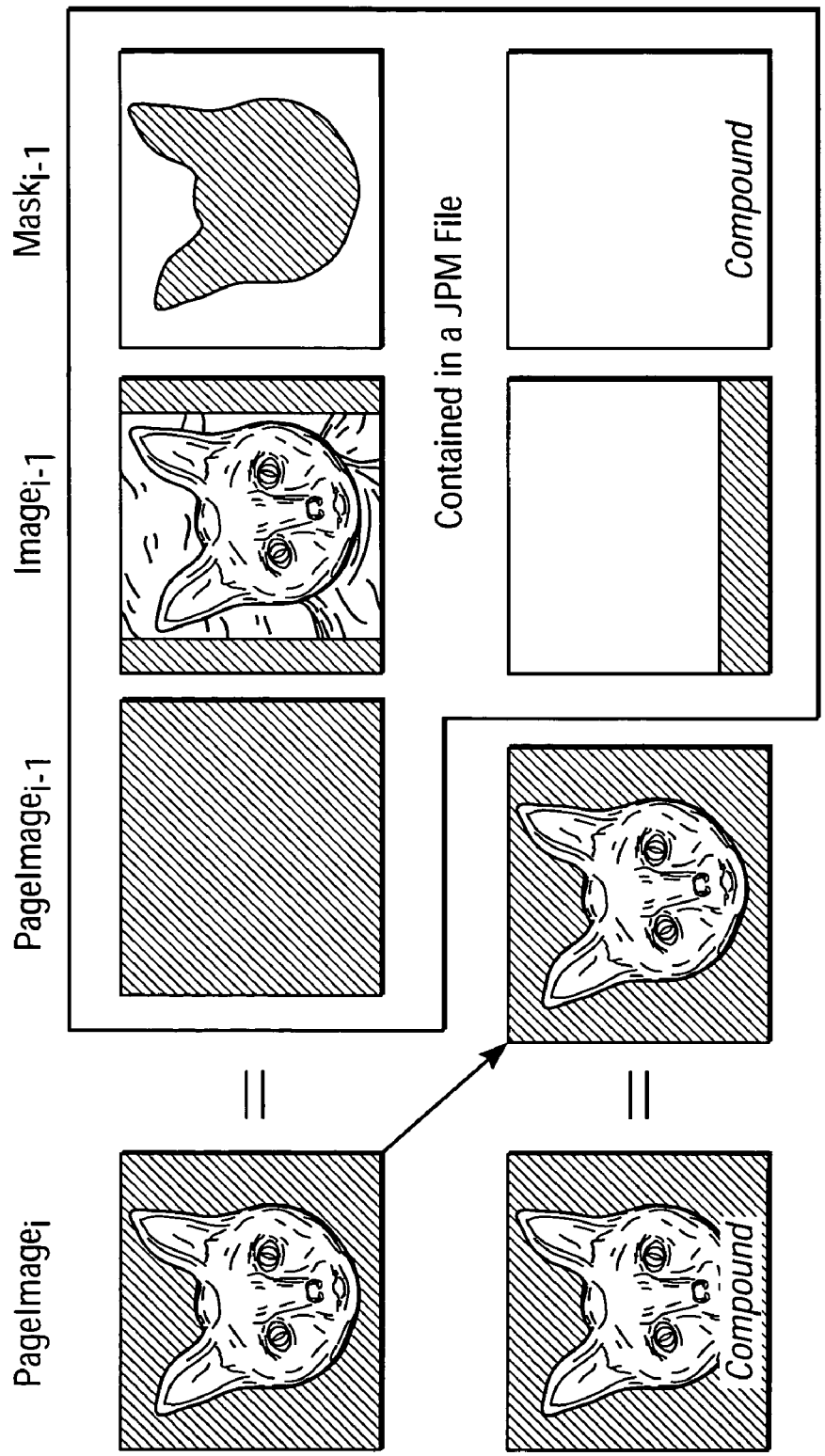
FIG. 1A shows an example of the elements of a JPM file.
Figure 1B:
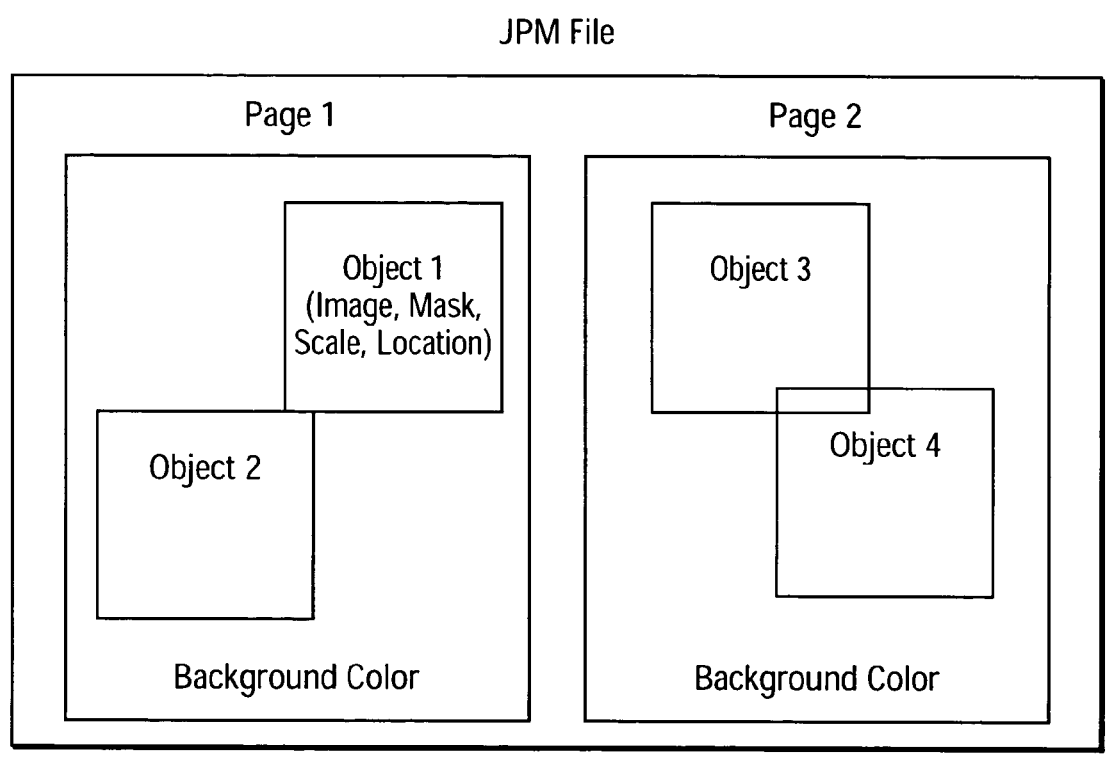
FIG. 1B is an example of a compound document from object masks and images.

A method and apparatus for creating standard JPM document files that have one or more of the following features: that have access to lower resolutions, progression bit rates, region of interest; that fragment codestreams via parsing or re-rendering without decoding; that collect pages of different characteristic or integrate descriptions of one page of those characteristics (e.g., thumbnail, monitor resolution, etc.); and that have metadata to describe all of these features.

In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

This application describes using JPEG 2000 in conjunction with older binary coders with a JPM file. Using these techniques, it is possible to get close to the best rate distortion performance and have access into the JPM file. A description of how to access lower resolutions, regions, and bit-rate progression of the page image is described below, particularly in cooperation with the use of a file format such as JPM. It is in the organization of objects, use of redundant objects and codestreams, use of shared data, arrangement of object masks, and use of metadata that contributes to techniques described herein.

Other formats, such as JPEG, could be used with these techniques.

JPM Features

JPM is a multiple page file format that uses an object-based representation of a page, where each layout object has a scale, location, and possibly an object mask and/or an object image. No more than one codestream is associated with an object mask or with an object image.

A JPM file is made up of boxes. Some of the boxes may contain codestreams. These codestreams may be object images or object masks that are encoded with one particular encoder. Since object masks are typically binary, they are typically compressed with a binary compressor (e.g., a JBIG compressor), while images are often continuous-tone and compressed with a continuous tone compressor (e.g., a JPEG 2000 compressor). However, object masks may be continuous tone (contone) and object images may be binary and can be compressed accordingly. The techniques for extending JPEG 2000 access features to the JPM file can be used with any non-JPEG 2000 encoder for either an object mask or image.

Note that the techniques described herein may be used with JPEG 2000. A separate set of techniques is described herein to achieve these features for non-JPEG 2000 type compressors. The application of these techniques is independent of whether the object is an object image or object mask.

Note also that the techniques described herein do not require having a codestream in a box, although a box may refer to a file.

JPEG 2000 Coding Features

JPEG 2000 is a continuous-tone image compression system designed to provide state-of-the-art compression while also having features like access to lower resolutions, lossy to lossless bit-rate progression, and region-of-interest access. JPEG 2000 takes advantage of a wavelet transformation for multiresolution access, bit-plane coding of the coefficients for bit-rate progression, and tiling, precincts and coefficient shifting for region-of-interest access. JPEG 2000 can be used for the image and/or mask part of an object.

JPM was not designed with these features in mind. It was designed to store multiple pages with multiple objects oriented within a page. There is no inherent scalability in non-JPEG 2000 codestreams. The JPM binary object mask and image architecture does not trivially allow these desirable features. Portions of this disclosure describe techniques to create and access JPM files that allow this type of access.

One technique described herein includes storing some redundant data (e.g., extra pages, extra object masks, extra metadata, extra boxes, etc.) and some non-redundant data (e.g., JPEG 2000 compressed images) to allow progression and manipulation of a JPM file. In this way, the JPEG 2000 features are preserved.

Access Features

JPEG 2000 allows many different types of access to the codestream. A number of these access features may be used to achieve JPEG 2000 type access when a codestream is stored in a JPM file. That is, when both JPEG 2000 and non-JPEG 2000 codestreams are stored in a JPM file, some of the same types of access that are permitted to JPEG 2000 codestreams using standard JPEG 2000 decoders are available. Note that this access may be independent of how the codestream is stored.

The access features described below are based on dividing up one or more codestreams in a known manner and creating a legal JPM codestream that may be operated upon by a dumb decoder to produce an output image or by a smart decoder that is able to take advantage of how the codestream(s) are arranged inside the file to provide a desired access to the JPM file. A dumb decoder is a decoder that is capable of handling a standard compliant JPM file, while a smart decoder is a decoder that is capable of handling a standard compliant JPM file in addition to being able to handle other features.

Resolution Access with Redundant Object Masks

JPEG 2000 files allow access to resolutions that differ in size by powers of 2. For JPEG 2000, if an individual desires a lower resolution image, the packets in the codestream corresponding to the lower resolution sub-bands may be taken in a manner well-known in the art and described in the JPEG 2000 standard. The number of resolutions available depends on the number of decompositions performed.

There are other coders for which JPM object masks and JPM object images may be used that don't have the same features as JPEG 2000. For these cases, the coders may be supplemented with additional functionality to generate images at different resolutions or may utilize redundant codestreams in the file to achieve redundant codestreams. This information may be wrapped in boxes, referenced by page descriptions, and explained by metadata in boxes or referenced in other boxes to create the correct JPM file for the various resolutions.

More specifically, in one embodiment, a decoder receives a command to provide an output image at a particular resolution. The command may come from an application program, a command line interface, a user interface, a parser, or any other well-known command generator. In response to the command, the decoder accesses a JPM file and locates the object masks corresponding to the requested resolution and decodes it. In one embodiment, the decoding may be performed using a JBIG decoder. Similarly, the decoder accesses only that portion of the JPEG 2000 codestream necessary to obtain object image at the desired resolution in a manner well-known in the art for JPEG 2000 processing.

In one embodiment, to obtain better compression performance, most object masks and some object images may be better compressed with a binary compressor. To achieve lower resolution, it is certainly possible to decode an object mask and scale it to the correct size. To do this, it is important to match the downsampled object mask to the downsampled object image for the best reconstructed object.

For faster access and to be able to be decoded by standard decoders, it may be desirable to have redundant versions of the binary object mask (or image). FIG. 2A shows an example resolution access to three resolutions with the JPEG 2000 image codestream. In one embodiment, different resolutions are all available by storing multiple binary (e.g., JBIG) codestreams in a JPM file. In one embodiment, these are redundant binary object masks and only differ in resolution. In one embodiment, to create three resolutions for the object mask, three JBIG codestreams are used. Referring to FIG. 2A, JPEG 2000 resolution progression enables access to various resolutions from the same codestream using a JPEG 2000 decoder. The resulting images are shown as images 2002, 2003, and 2004. These are accessed in a manner well-known in JPEG 2000 by accessing the JPEG 2000 codestream to a certain depth using the correct headers associated with data in a manner well-known in the art. There is also a unique JBIG codestream at each resolution. To obtain the desired resolution, only the JBIG codestream for the desired resolution is obtained from the file and decoded. Note that in one embodiment, the object image in the JPM file in FIG. 2A is the JPEG 2000 codestream while the JBIG codestreams represent redundant versions of the object mask, with the background color for the output image being white; however, the association of the object image to the JPEG 2000 codestream and JBIG codestreams to the object mask may be reversed.

The JBIG standard does provide for encoding two resolutions for one codestream with the lower resolution appearing in the codestream first and being independently decodable. This can be used to reduce the number of codestreams to $$\lceil \frac{num\_res}{2} \rceil.$$

Figure 2B:
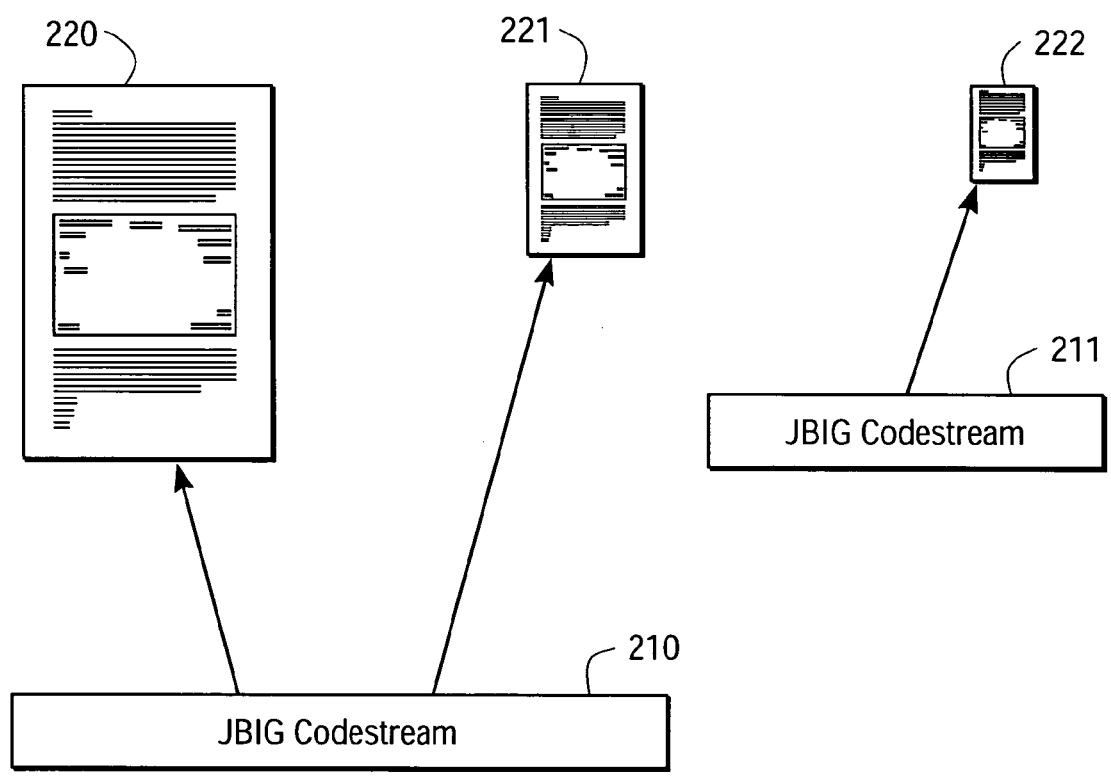
FIG. 2B illustrates resolution access with JBIG resolution reduction.

This is shown in FIG. 2B. Referring to FIG. 2B, the first JBIG codestream 210 corresponds to images 220 and 221, while the second JBIG codestream 211 corresponds to image 222. These can be used to reduce redundant codestreams.

A smart decoder accesses only the object mask codestreams and the JPEG 2000 codestream resolution necessary to reconstruct the desired image in order to generate an image at the desired resolution. Such a smart decoder may know which object mask is which in the JPM file by using metadata in the JPM file. Alternatively, a non-metadata way is to arrange object masks in resolution order may be used.

Page box and page collections may also be used to inform a smart decoder about which object mask is which in a JPM file.

Region of Interest (ROI)

There are two basic types of ROI, predetermined ROI (at encode time) and user interactive (on the fly, at decode or transmission time). Predetermined ROI is supported in the JPEG 2000 codestreams by the ROI coefficient shifting functions (see JPEG 2000 Part 1). If a JPEG 2000 codestream is prepared in this way, then it can be placed in a JPM codestream.

Normal JPEG 2000 bit-rate progression exposes and refines the ROI areas before the background. This may be implemented by having a self-masking JPEG 2000 codestream. In this case, the mask of the object would be fully rendered and the JPEG 2000 codestream would only have the ROI rendered.

Another way to execute predetermined ROI in JPM is to create objects that correspond to the ROI. That is, using object ordering, a number of objects, n, that fit into the region of interest, where n is greater than or equal to one, and a smart decoder stops decoding after the region of interest or sets up a page to only contain that region of interest. These objects would be called out first in the Page box. In this case, both the mask and image of the object are fully rendered before the next object is rendered.

In another embodiment, the other method of ROI is interactive with the user. Perhaps the user desires to zoom or pan around an image. To facilitate this functionality, the document is "tiled" into adjacent rectangular and regular objects. The binary object mask is divided into the correct independent codestreams for each "tile" (with perhaps redundant codestreams for different resolutions, etc.). The JPEG 2000 codestream may remain one codestream with the shared data entry boxes (SDEs) or tile-parts for a "tile" associated with the object. Thus, objects are used as tiles.

Figure 3A:
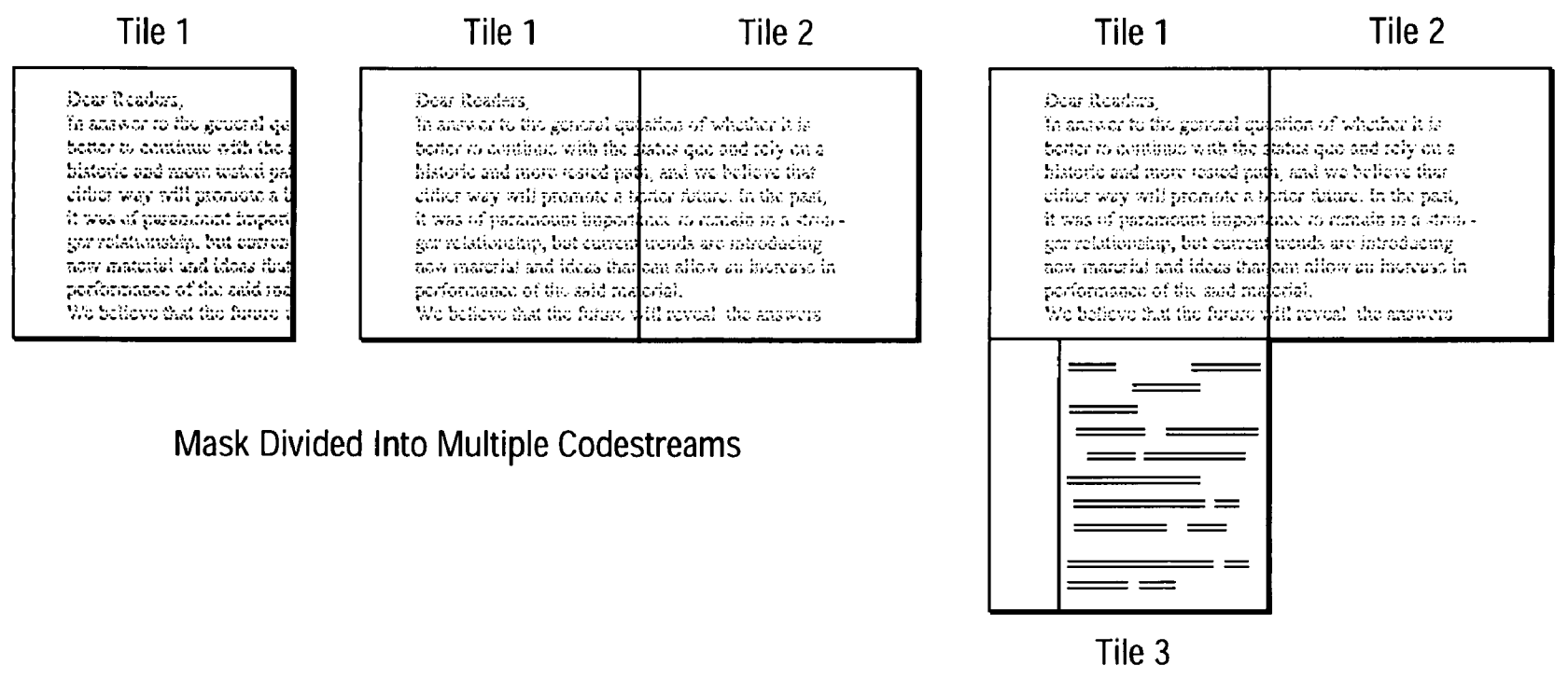

Finer grain access to binary object images or masks can be provided by splitting the binary image into different layout objects. Each layout object contains a complete codestream, but only for a small portion of the image. The smart JPM decoder will not access those layout objects that lie outside the region of interest. A single JPEG2000 codestream is tiled and each tile is accessed for a different image object. The corresponding mask object could be created by tiling the object mask and having separate codestreams, one for each tile object. A "tiled" JPM file can be created by mapping objects to tiles and tiles to objects. A JPEG 2000 codestream can be regularly tiled (and/or divided into precincts). This is not the case with most binary compressors. To achieve tiling for binary codestreams, whether or not these codestreams are associated with JPEG 2000 tiled codestreams, the binary images can be tiled before compression and the individual streams stored as separate objects. That is, for a non-JPEG 2000 codestream, the codestream is divided up into tiles and each tile is separately encoded into separate codestreams. FIG. 3A shows region of interest access with tiles. A decoder accesses only the object mask codestreams and the JPEG 2000 codestream tiles necessary to reconstruct the desired image. Referring to FIG. 3A, a number of tiles are shown (1, 2, 3), where the object mask is divided into multiple codestreams. In the JPM file, each of the tiles is a layout object, and all layout object is derived from one JPEG 2000 codestream and a number of other non-JPEG 2000 codestreams. Thus, the decoder provides region of interest access with binary codestreams. Note that a standard decoder decoding this JPM, the output image would still be the full image, not the region of interest, while a smart decoder decoding this JPM file could obtain the region of interest.

With a standard decoder without knowledge attempted to display, for example, the upper left corner of a page, it would render the entire page in memory, and then only copy the upper left corner to the screen. This is inefficient because all layout objects and codestreams must be accessed and decoded. A smart decoder would only access the necessary layout objects, which intersect the upper left corner. Any layout objects and the corresponding codestreams that only affect other portions of the page need not be accessed and decoded.

If a layout object that intersects the region of interest contains a JPEG 2000 codestream, only the portions of that JPEG 2000 codestream that affect the ROI need be decoded. For example, if the JPM decoder is decoding the upper left corner of a page and there is a layout object of an image covering the entire page, only those tiles of the JPEG 2000 image which will be on the upper left corner of the page once decoded and rendered need to be accessed.

JBIG and the other binary codestreams do not provide random access to tiles. JBIG codestreams do allow banding or striping, that is random access to portions of the image that are the width of the page, but some limited number of lines high. In this case, an advanced decoder could just access the bands that intersect the region of interest. This is likely to be more efficient than decoding the entire codestream, but less efficient than accessing tiles.

Figure 3B:
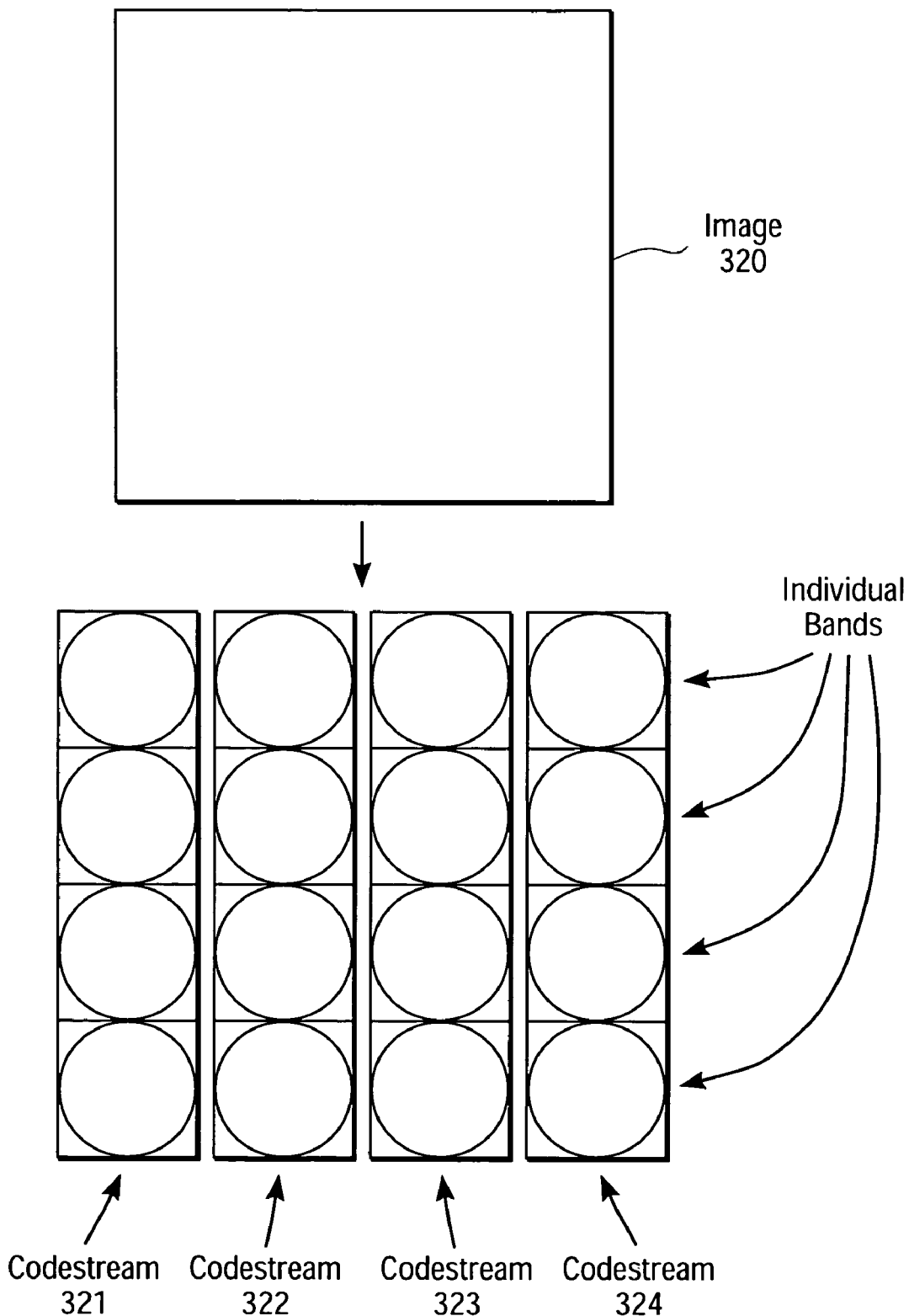
FIG. 3B illustrates region of interest access with banded and tiled binary (JBIG) codestreams.

FIG. 3B illustrates the use of banding. Referring to FIG. 3B, an image 320 is divided up vertically into four codestreams, 321-324. Then banding may be used to divide each of codestreams 321-324. These may be considered tiles. The object image or object mask may be handled in this manner.

The banding allowed in JBIG may be combined with splitting a binary image into separate layout objects. Thus, as shown in FIG. 3B, a large region can be divided into 4 layout objects (called tiles in FIG. 3B). This provides random access in one dimension. Each of those codestream in those layout objects can be banded, providing access in the other dimension.

Note that the division of binary object images and masks into smaller portions may be most efficient if it matches the tiles in a JPEG 2000 codestream for the same region, but this is not necessary. In fact, the binary object could be divided into overlapping layout objects.

Rate Control and Progression

JPEG 2000 offers bit-rate progression. For JPM files that are dominated in size by JPEG 2000 codestreams as is usually the case, the rate control for JPEG 2000 can be used for JPM rate control. For example, in the case of a JPM file with two JPEG 2000 codestreams, a certain rate allocation may be made between the two in a manner well-known in JPEG 2000. On the other hand, if there are binary codestreams in JPEG multi-resolution or JBIG lossless, then there is discardable data and other rate control is necessary such as is described below.

Figure 3C:
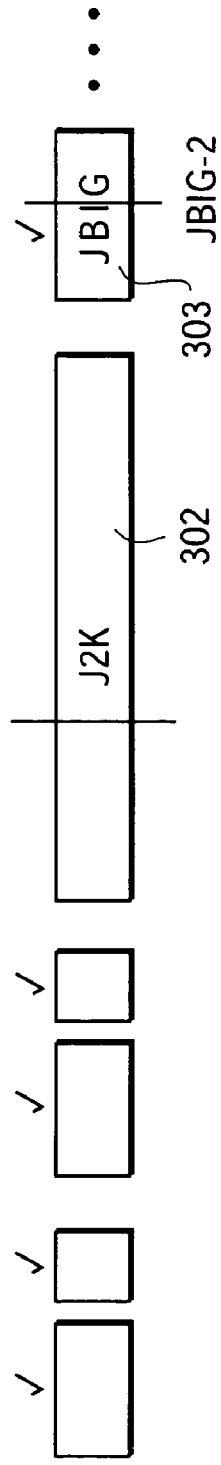
FIG. 3C illustrates an exemplary JPM file.

FIG. 3C illustrates an exemplary JPM file. Referring to FIG. 3C, JPM file 301 includes a number of boxes (e.g., SDE boxes). These boxes include boxes that store metadata, portions of a JPEG 2000 codestream and portions of a JBIG codestream. Note that there is a substantially larger amount of JPEG 2000 codestream 302 than the other portions of the JPM file, such as JBIG codestream 303. In one embodiment, a command may be given that limits the size of the JPM file to a specified size. The size can be user or application specified. In such a case, all the boxes of JPM file 301 other than those containing the portions of JPEG 2000 codestream 302 are processed further (e.g., sent, prepared to be sent, stored, etc.) and then JPEG 2000 codestream 302 is truncated, potentially to fit in the remaining bandwidth that is available if the codestream 302 is being sent. That is, all of the JBIG codestream 303 is stored before any of JPEG 2000 codestream 302 and then depending on the remaining available bandwidth a portion of JPEG 2000 codestream 302 is stored. This is possible because of the progressive nature of the JPEG 2000 codestream. Thus, portions of the JPEG 2000 codestream are sent until the allowed rate is reached.

Some limited binary progression is also enabled by the two-stage codestream of the JBIG-2 coder (codebook lookups followed by difference image). In such a case, this codestream could also participate in rate control and discard the different image for one layer of bit-rate progression.

Likewise, the resolution reduction allowed by the JBIG compressor allows some progression. The high resolution data can be discarded and the low resolution data interpolated.

Figure 3D:
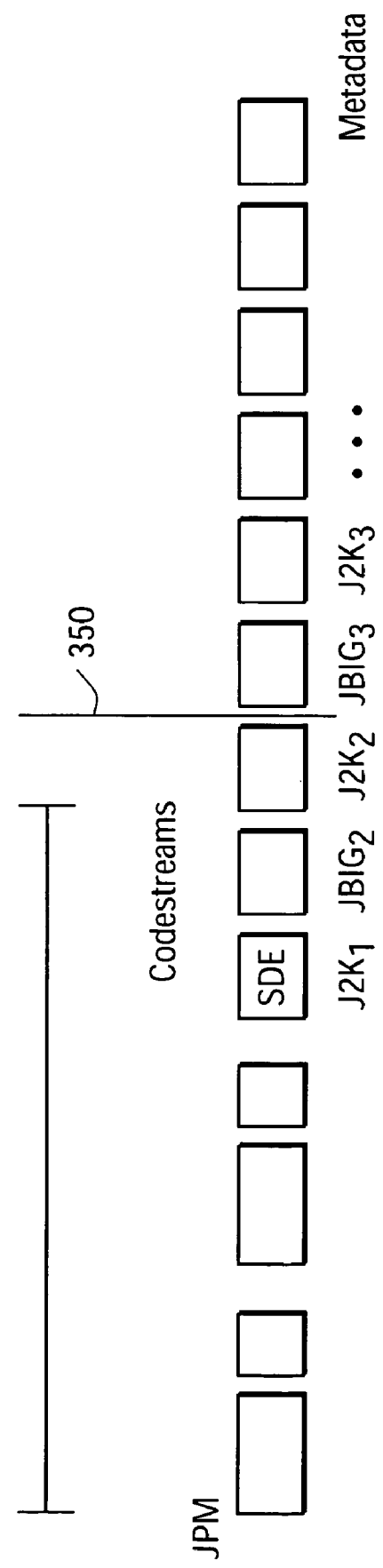
FIG. 3D illustrates another JPM file in which boxes are arranged to facilitate progressive processing.
Figure 4:
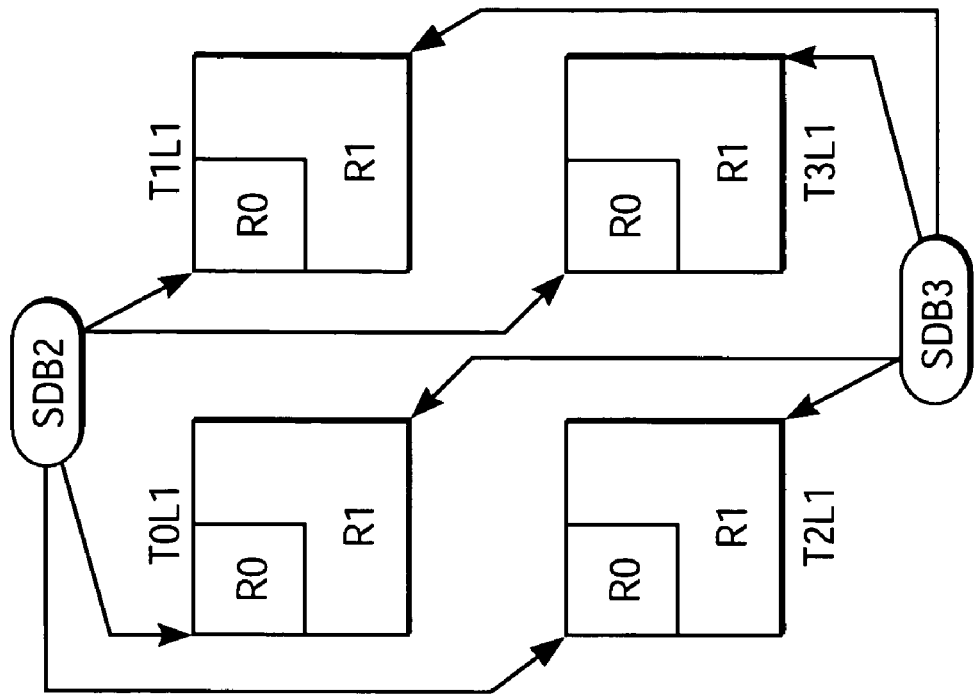
FIG. 4 illustrates JPEG 2000 codestream access via shared data boxes.
Figure 4:
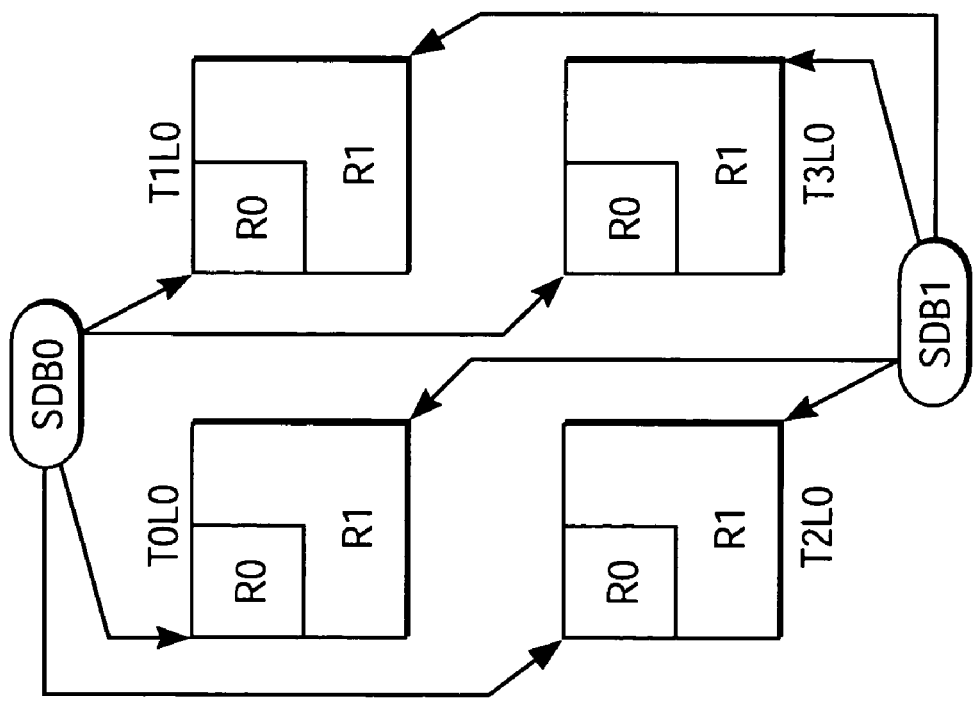

More specifically, in one embodiment, the JPM file includes many SDE boxes. FIG. 3D illustrates an exemplary JPM file. Five of the SDE boxes may contain, for example, a first JPEG 2000 part ($J2K_1$), a first JBIG-2 part ($JBIG2_1$), a second JPEG 2000 part ($J2K_2$), a second JBIG-2 part ($JBIG2_2$) and a third JPEG 2000 part ($J2K_3$). The boxes can be arranged to allow the JPM file to be progressive such that as the JPM file is being processed and when a particular portion of the file has been reached, for instance, after sending a predetermined amount of the file, the remainder of the JPM file is truncated. In FIG. 3D, line 350 illustrates a truncation point in which the boxes to the left of line 350 are sent (or processed) and the boxes to the right are truncated.

Component Access

It is possible to extract certain components only. For example, in one embodiment, only the luminance component is extracted from a JPEG 2000 file. The color could be changed according to the application by accessing the Base Color box. A RBG (red, green, blue) background noise may be converted to a luminance. That is, when putting the object mask and luminance image together, only a black and white image (gray scale) is then produced. This may be useful when printing to a black and white printer.

In another example, the luminance of an object and the luminance of a colored background may be extracted and combined using an object mask. Thus, a component may be extracted from a JPM file to enable access to components normally available only to a JPEG 2000 parser operating on a JPEG 2000 codestream.

Codestream Storage in a JPM File

One JPEG 2000 codestream can contribute to several objects. A codestream may be broken down to facilitate parsing. The broken down codestream may be in the JPM file in a manner that facilities parsing. For example, a JPEG 2000 codestream may be in a JPM file in a contiguous codestream box.

In the JPM file, since all the essential elements of a JPEG 2000 codestream are available, the codestream may be divided and wrapped in individual shared data entry (SDE) boxes. Each box may contain a single packet, a tile-part, or some other useful structure corresponding to resolution, tile, progression layer or all of the above. Each of these SDE boxes may be referred to in order to access it in a certain order.

In another embodiment, the fragment list, or table, allows fragments to be entered in such a way that when the fragments are put together a parsed codestream is formed. The fragment table points to parts of the codestream that are to be put together. In one embodiment, in order to modify a codestream, only the fragment table need be modified. The same structures can be listed in the fragment table.

Through the use of the fragment table or shared data reference boxes, a new codestream may be put together. More specifically, the shared data reference boxes may point to a specific shared data entry boxes, while a fragment table uses lengths and offsets to point to specific parts of the JPM file. This new codestream is referenced without requiring a parser to generate the codestream. Thus, one can throw away those parts of the codestream that are not going to be used in the future since they are not referenced. This could be done by a consolidator function, such as is described in more detail below.

The SDE box may contain any part of a JPEG 2000 codestream, only one tile-part, or only one packet. A tile-part can contain a number of packets from a given tile. The location and progression of tile-parts are well defined in the JPEG 2000 codestream. However, the image data represented and the packets contained in the tile-parts are not defined by the codestream. The encoder has many choices.

In one embodiment, all codestreams may be non-JPEG 2000 codestreams with tile-resolution association and may be stored in SDE boxes or listed in fragment tables. In one embodiment, a JBIG-2 codestream may include a lossy image and a remainder image in two separate SDE boxes. In another embodiment, JBIG has a mode where there is an image of low resolution and a high resolution remainder.

Metadata for Informating a Parser of Codestream Parts and Meaning

Metadata may be used to describe the JPM file to the parser. In one embodiment, metadata is used to describe how the codestream has been divided into SDE boxes. In one embodiment, the metadata is located in the beginning of a JPM file. However, this is not a requirement for the metadata may be located anywhere in the JPM file or in many places in the JPM file.

Note that this metadata is not strictly needed by a parser. A JPM parser could receive a JPM file, extract the codestreams, and then use a conventional JPEG 2000 parser to divide up the codestreams so that only those parts desired by a user remain. Other methods, even complete decoding, could be used. However, this process would be slower than with informative metadata.

Index of SDE Signals Content

There are a number of ways to explain what codestream data is present and which SDE box it is in. The index values of the SDE boxes may be used to indicate what parts of the codestream are contained in those boxes. Then the SDE Boxes present (or the ranges) can be signaled in metadata as described in more detail below. Also, metadata can explicitly describe the contents of each SDE Box.

One or more indices may be used to gain access to the codestream without use of the fragment table. Each SDE box has its own index. The indices may be in any order. In one embodiment, the index can be any number; however, the selection of indices may enable the indices to provide information on its face as to what information in the SDE box or as to the data the SDE box points.

SDE Box Index Value

Using a shared_data_ID as the descriptor for the codestream packet information is one technique for selecting a unique ID for SDE box. Use of this technique results in the selection of a unique ID number for SDE box and shared data reference box could be selected so that a packet data of a JPEG 2000 codestream for a given tile, resolution, layer and component can be identified.

The pseudo code below describes one embodiment of a process for assigning index numbers for JPEG 2000 codestream packets. This technique works for multiple codestreams.

```
offset [0] = 0
for(i = 0; i < Codestream; i++)
{
  for(tile = 0; tile < num_tile[i]; tile++)
  {
    for(resolution = 0; resolution < num_res[i]; resolution++)
    {
      for(layer = 0; layer < num_layer[i]; layer++)
      {
        for(comp = 0; comp < num_comp[i]; comp++)
        {
          var = tile * (num_comp[i] * num_layer[i] * num_res[i])
            +resolution * (num_comp[i] * num_layer[i])
            +layer * num_comp[i] + comp;
          index[i][var] = offset[i] + var
        }
      }
    }
  }
  offset[i+1] = offset [i] +
    num_tile [i]*num_comp[i]*num_layer[i]*num_res[i];
}
Constraint:
((num_tile[i] * num_res[i]) * (1 + (num_layer[i] * num_comp[i])) +
2 * num_code) < 65,536
``` where num_code=the number of codestreams in the JPM file, i is the index which counts the number of codestreams from 0 to num_code,
num_tile[i]=the number of tiles in codestream i,
num_res[i]=the max number of resolutions in codestream i,
num_layer[i]=the max number of layers in codestream i, and
num_comp[i]=the number of components in codestream i.

Below is a specific example showing SDE box index numbers generated using the algorithm for 3 codestreams. The first codestream has 2 tiles and 1 resolution. The second codestream has 3 tiles and 1 resolution. The third codestream has 2 tiles, 2 resolutions. The corresponding index numbers are shown for object masks, main header and tile headers. Note that the component and layer do not change the object mask size. The same object mask could be used for different layers and different components.

Codestream 0
   index=65535 var=0 tile=0 resolution=0
   index=65534 var=1 tile=1 resolution=0
   tileheader=65532 mainheader=65533

Codestream 1
   index=65531 var=0 tile=0 resolution=0
   index=65530 var=1 tile=1 resolution=0
   index=65529 var=2 tile=2 resolution=0
   tileheader=65527 mainheader=65528

Codestream 2
   index=65526 var=0 tile=0 resolution=0
   index=65525 var=1 tile=0 resolution=1
   index=65524 var=2 tile=1 resolution=0
   index=65523 var=3 tile=1 resolution=1
   tileheader=65521 mainheader=65522

Note that all the tile headers are given the same indexes.

These example results show the corresponding packets related to the object masks, main headers and tile headers mentioned above. Additional information regarding Codestream 0 is the 3 components for Tile 0 and Tile 1. Similarly, more additional information can be seen for Codestream 1 and Codestream 2.

In the examples, numbers at the upper end are used to index the object mask and headers. The numbers starting from zero and increasing are used for packets. This way packets for a particular resolution and tile can be identified easily.

Codestream 0
   index=0 var=0 tile=0 res=0 lay=0 comp=0
   index=1 var=1 tile=0 res=0 lay=0 comp=1
   index=2 var=2 tile=0 res=0 lay=0 comp=2
   index=3 var=3 tile=1 res=0 lay=0 comp=0
   index=4 var=4 tile=1 res=0 lay=0 comp=1
   index=5 var=5 tile=1 res=0 lay=0 comp=2

Codestream 1
   index=6 var=0 tile=0 res=0 lay=0 comp=0
   index=7 var=1 tile=0 res=0 lay=0 comp=1
   index=8 var=2 tile=0 res=0 lay=1 comp=0
   index=9 var=3 tile=0 res=0 lay=1 comp=1
   index=10 var=4 tile=1 res=0 lay=0 comp=0
   index=11 var=5 tile=1 res=0 lay=0 comp=1
   index=12 var=6 tile=1 res=0 lay=1 comp=0
   index=13 var=7 tile=1 res=0 lay=1 comp=1
   index=14 var=8 tile=2 res=0 lay=0 comp=0
   index=15 var=9 tile=2 res=0 lay=0 comp=1
   index=16 var=11 tile=2 res=0 lay=1 comp=0
   index=17 var=11 tile=2 res=0 lay=1 comp=1

Codestream 2
   index=18 var=0 tile=0 res=0 lay=0 comp=0
   index=19 var=1 tile=0 res=0 lay=0 comp=1
   index=20 var=2 tile=0 res=1 lay=0 comp=0
   index=21 var=3 tile=0 res=1 lay=0 comp=1
   index=22 var=4 tile=1 res=0 lay=0 comp=0
   index=23 var=5 tile=1 res=0 lay=0 comp=1
   index=24 var=6 tile=1 res=1 lay=0 comp=0
   index=25 var=7 tile=1 res=1 lay=0 comp=1

There are a number of ways to access tile headers. If the tile headers are limited to contain only SOT and SOD markers, then every tile header is 14 bytes long. This way an appropriate tile header can be extracted based on the sequential order of tile headers stored in this SDE box. There are several ways to arrange the tile headers. One example is to have the Resolution 0 tile header for Tile 0 first, then the Resolution 1 tile header for Tile 0 and Resolution 2 tile header for Tile 0. The same order for Tile 1 follows.

If the tile headers have variable length, the appropriate tile headers may be extracted based on the sequential order and the SOT and SOD markers. In one embodiment, tile headers always begin with SOT marker and end with SOD marker. By tracking these markers, tile headers can be identified. The tile header is to be extracted it depends on the sequential order of how tile headers are arranged in SDE as mentioned above.

If the main headers are stored in a similar order as mentioned above, namely Resolution 0, Resolution 1 and Resolution 2, an appropriate main header can be easily identified since main headers begin with SOC markers. Thus, access to main headers is easy.

SDE Boxes Containing Tile Parts

If instead of packets the intention is to store tile-parts in the codestream, the pseudo code below may be used as one embodiment of a such a process.

```
for(i=0; i<Codestream; i++)
{
for(tile=0; tile<num_tile[i]; tile++)
{
   for(tile-part=0; tile-part<num_tp[i]; tile-part++)
   {
     var=tile*num_tp[i]+tile-part;
     index[i][var]=offset[i]+tile*num_tp[i]+tile-part;
   }
}
offset[i+1]=var+offset[i]+1;
}
```

Codestream 0
   index=0 var=0 tile=0 tp=0
   index=1 var=1 tile=0 tp=1
   index=2 var=2 tile=1 tp=0
   index=3 var=3 tile=1 tp=1

Codestream 1
   index=4 var=0 tile=0 tp=0
   index=5 var=1 tile=0 tp=1
   index=6 var=2 tile=1 tp=0
   index=7 var=3 tile=1 tp=1

Object Masks for Tiles Stored in SDE Boxes

In one embodiment, the number of object masks for tiles required is the number of tiles multiplied by the number of resolutions. The index number for the object masks will be numbers counting down from the maximum number allowed in the 2-byte number, which in one embodiment is 65,535. Images with different quality layers and different components can re-use the object masks provided above because the image sizes do not change.

In one embodiment, main headers of the JPEG 2000 codestreams for different output options such as resolutions, qualities, tile regions and components, are stored in a SDE box. Similarly, in one embodiment, tile headers for different situations are stored in a separate SDE box. In one embodiment, tile headers are stored in sequential order so that the correct tile header for a particular tile can be parsed or extracted based on the tile number.

For better parsing, tile headers for one resolution, such as, for example, a thumbnail, can be stored in a separate SDE box if the index number permits.

In one embodiment, the 2-byte index number in the SDE box allows 65,536 unique SDE boxes. If the number of packets, the number of object masks, the main headers and tile headers are fewer than 65,536, then it is possible to have the index imply the data contained in the SDE.

The pseudo code below describes one embodiment of a process for assigning index numbers for object masks, main headers and tile headers of JPEG2000 codestreams.

```
for(i=0; i<codestreams; i++)
{
for(tile=0; tile<num_tile[i]; tile++)
{
   for(resolution=0; resolution<num_res[i]; resolution++)
   {
     var=tile*num_res[i]+resolution;
     index_mask[i][var]=65535-offset[i]-tile*num_res
        [i]-resolution;
   }
}
offset[i+1]=var+offset[i]+3;
index_tileheader[i]=65535−var−offset[i]−2;
index_mainheader[i]=65535−var−offset[i]−1;
}
```

Metadata Boxes to Describe SDE Contents

In one embodiment, each index is indicative of the codestream portion that is in the SDE box.

In one embodiment, if the indices generated above are sequential, it may be possible to specify ranges when indicating a portion of the codestream that is desired. The ranges may be specified using the beginning and ending indices of a given parameter.

Range of Packets Present, SDE Indices Implied

Figures 5, 6:
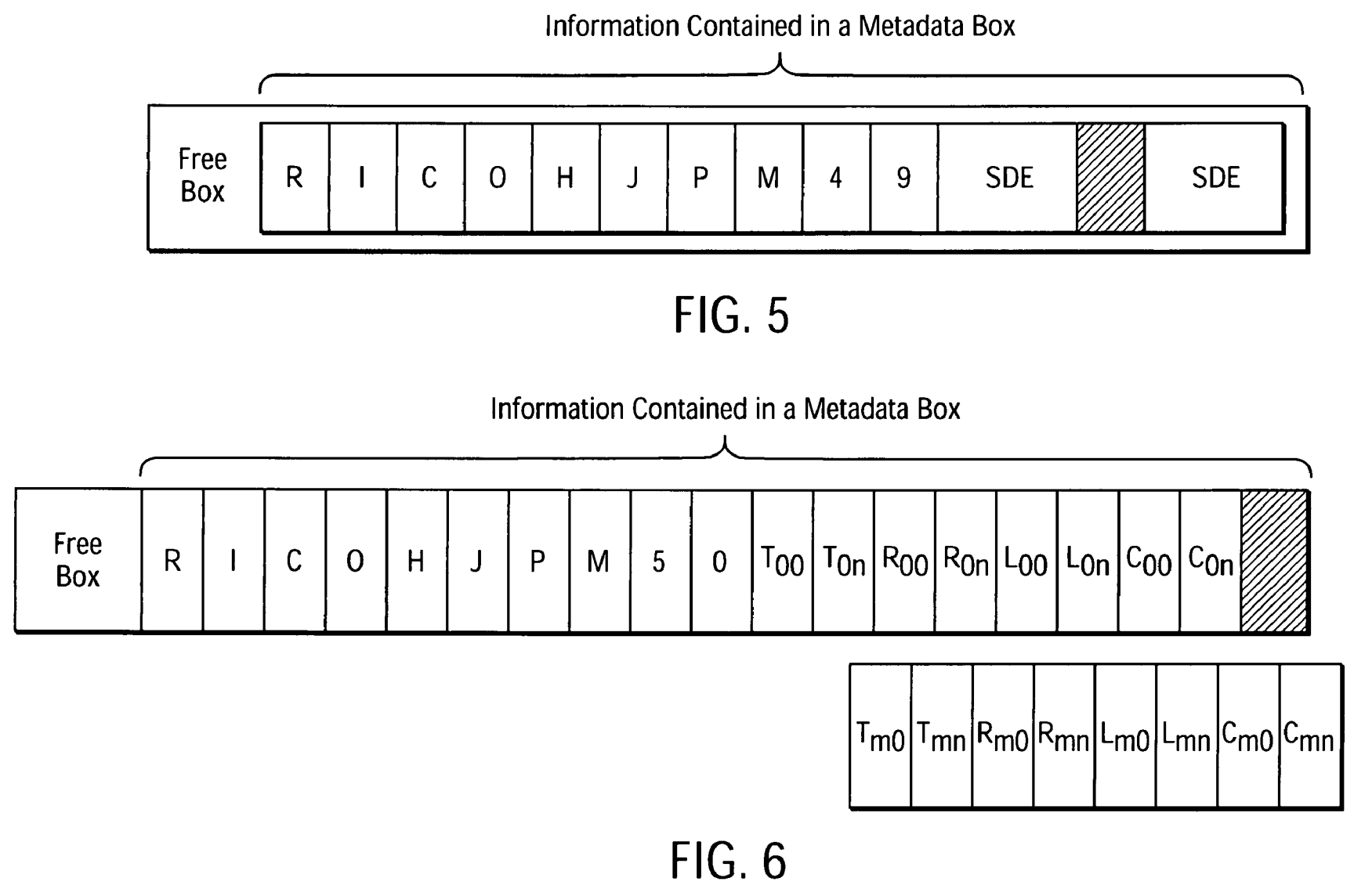

FIG. 6 shows an another alternative embodiment of a syntax. The syntax is contained in a metadata box, such as a Free box. Referring to FIG. 6, the ranges of packets/SDE boxes present are shown. This one is denoted with a unique ASCII string such as, for example, RICOHJPM50; other strings may be used. For each range (which could be only one packet/SDE Box), the beginning and ending tile ($T_{00}$, $T_{0n}$), beginning and ending resolution ($R_{00}$, $R_{0n}$), beginning and ending layer ($L_{00}$, $L_{0n}$), and beginning and ending component ($C_{00}$, $C_{0n}$) are given. In this example, each value in the range is limited to 8 bits (0-255). Other sizes could be chosen for each field.

There is no requirement that either of these types of metadata be present. Also, there is no requirement that all, or any, of the SDE boxes be described. In fact, a metadata box with the ASCII string (either, for example, RICOHJPM99 or RICOHJPM50) but no SDE information would be useful for alerting the parser or decoder that the index of the SDE boxes indicate the codestream data therein. There is no relationship between the order of the entries in the metadata box and the order that the SDE boxes are found in the file.

Range of Packets in Each SDE (Index May or May Not Apply)

In this embodiment, there is no constraint on the number of packets of the codestream contained in the one SDE box. In one embodiment, a range of packets is put into one or more SDE boxes. In this case, metadata may be used to indicate to the parser which packets are in a particular SDE box.

Figure 7:
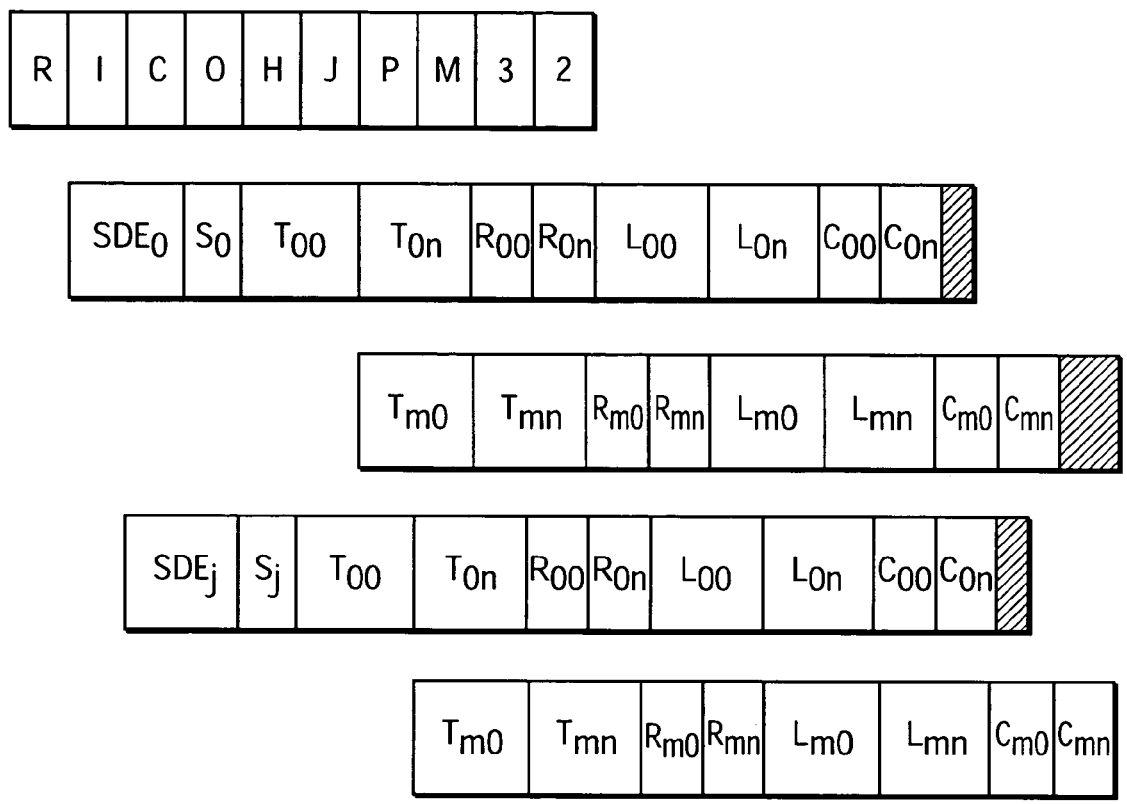
FIG. 7 illustrates still another exemplary metadata for a compact index representation of a shared data entry box.

FIG. 7 illustrates metadata for compactly representing SDE boxes. Referring to FIG. 7, the data in the SDE box is the following metadata distinguished by the ASCII string "RICOHJPM32'. In this example, the index of the SDE box does not necessarily indicate the contents. Also, there is no restriction on the number of packets or precincts in one SDE box.

The SDE index and the number of bytes to describe the ranges are included. Otherwise, it is similar to 'RICOHJPM50'. In one embodiment, the fields for the index of the SDE Box (SDE), the tiles (T), and the layers (L) are all two bytes, and the fields for the length of the SDE Box range description (S), resolutions (R), and components (C) are all one byte. Once again, different sizes could be chosen.

Same Metadata for Tile-Parts

It is possible to have similar metadata boxes, distinguished by a different number, signal that the SDE boxes contain tile-parts. These tile-parts can be enumerated by listing the SDE indexes, when indexes indicate tile-parts, or by listing the tile-parts present in each SDE boxes when they do not.

Another difference with the packet per SDE box for tile-parts is that it may not be clear what part of the image data the tile-parts describe. A field with an entry from the following table could describe how the tile-parts are organized (starting with the first through the last for each tile). This assumes that the progression of tile-parts is the same for each tile.

TABLE 1

Type field for tile-part progression in SDE boxes metadata

| Type | Meaning |
| --- | --- |
| 0 | Resolution progressive (lowest res, then next res, and so on), interleaved color |
| 1 | Layer progressive (lowest quality, next layer, and so on), interleaved color |
| 2 | Resolution progressive (lowest res, then next res, and so on), luminance then chrominance |

TABLE 1-continued

Type field for tile-part progression in SDE boxes metadata

| Type | Meaning |
| --- | --- |
| 3 | Layer progressive (lowest quality, next layer, and so on), luminance then chrominance |
| 4 | Thumbnail, monitor, printer, lossless |
| 5 | Inconsistent for each tile |
| 6-255 | reserved |

Bit-Rate of SDE Boxes

It is possible to include a repeating field in a metadata box that would offer the size of every SDE box. This would allow a parser to perform rate control by knowing the size of all the codestream parts.

Multiple Page Descriptions

Different Page Boxes for the Same Page in the File Found Anywhere

In one embodiment, the JPM file includes different page boxes for the same page. Each of these page boxes stores (or points to a file that stores) a different description of the same page. These page boxes may be found anywhere in the file.

Page Collections

There are a number of different ways to sort the multiple page descriptions. For example, all the page boxes with different page attributes for the same page may be grouped together. These different page attributes may include thumbnail, lossless/full resolution, monitor resolution, printer resolution, low-bit rate, etc.). On the other hand, all the page boxes with the same page attribute for the different pages may be grouped together.

Same Page Attributes, Different Pages (1, 2, 3, etc.)

Figure 11:
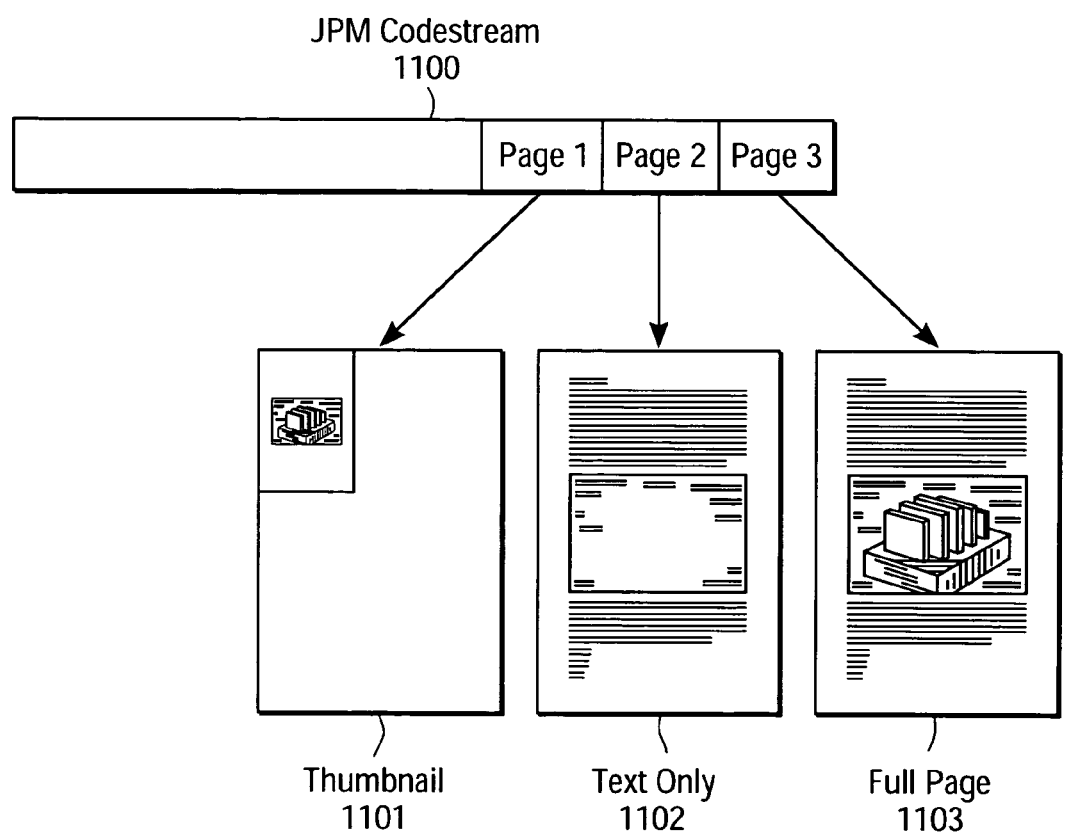
FIG. 11 is a multi-page description of JPM access.

Another way to organize a JPM file is by using multiple pages in a page collection to describe the same page. FIG. 11 shows an example of multi-page descriptions. Referring to FIG. 11, a JPM codestream 1100 is shown with page 1 being a thumbnail (1101), page 2 being the text (1102) of the image, and page 3 being the full image (1103). A traditional decoder would decode three independent pages, all correct. However, with the proper metadata, a smart parser or decoder could extract or decode only the appropriate page for each real page in the collection.

These pages could also serve as the description of differently parsed images. All a parser has to do to parse for a given page is remove the unreferenced codestream divisions and boxes, reform the file, and change all the pointers to the new locations.

With all parts of a codestream available in shared data boxes, there can be many different descriptions of a page without expanding the JPM file size much. These are referred to as page collections. In other words, a page may be described differently, possibly based on different characteristics.

Figure 12:
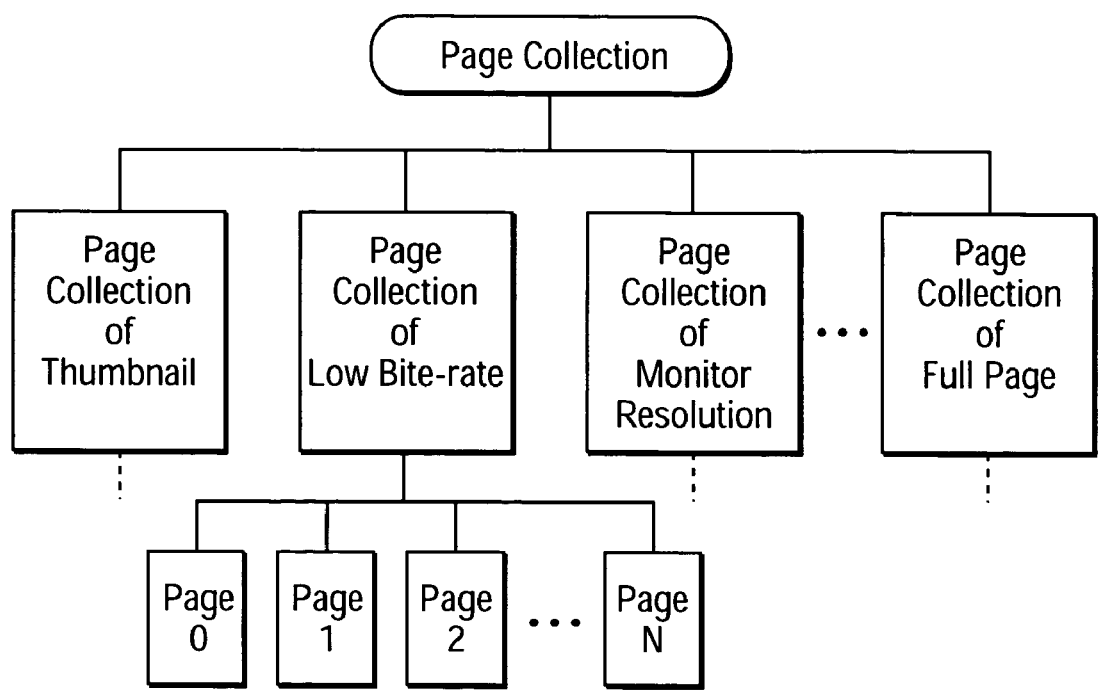
FIG. 12 illustrates a hierarchical relationship regarding a page collection arranged by tile with the tiles from each page collected together.
Figure 13:
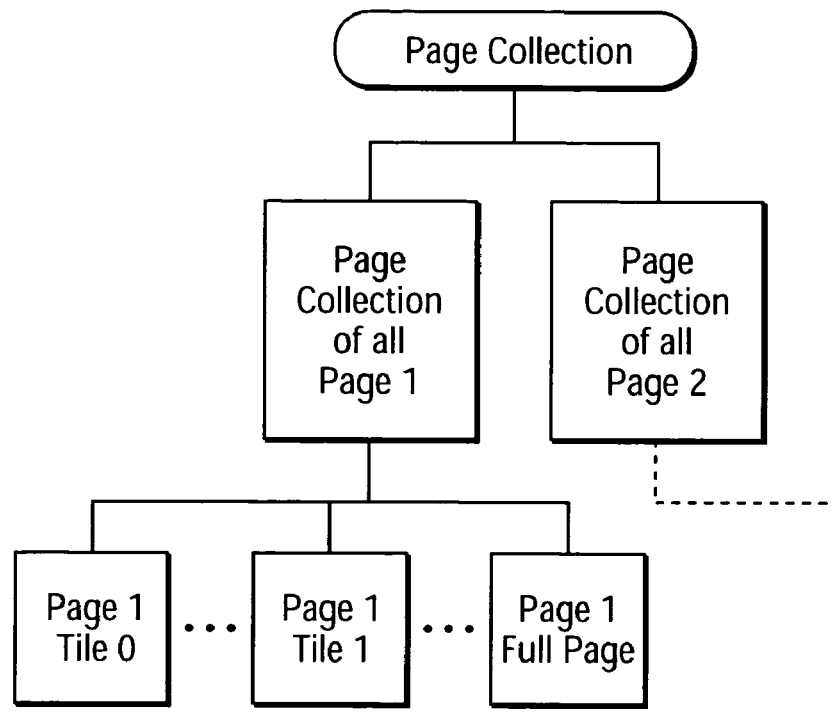
FIG. 13 illustrates a hierarchical relationship regarding a page collection arranged by page with all tiles for each page collected together.

Three main types of page collections are described herein. These include a page collection with only a single page, collections sorted by description type (e.g., thumbnail description of all the pages), and collections sorted by page (e.g., all descriptions of page 1). FIG. 12 illustrates a hierarchical relationship regarding a page collection arranged by resolution with the resolutions (e.g., thumbnail, low bite rate, monitor resolution, full resolution) from each page collected together. FIG. 13 illustrates a hierarchical relationship regarding a page collection arranged by page with all tiles for each page collected together.

As described herein, these page collections may be set up using shared data boxes, where each shared data box points to a certain object for a page, and metadata that describes the collection to a parser.

In one embodiment, the page description parser receives a JPM file with shared data boxes and metadata and user desired output control. The user desired output control may include specifying the description type, pages, page collections, an amount of structure to preserve.

The operations performed by such a parser may include reading the metadata, editing boxes, skipping or removing (without copying) shared data boxes or other boxes, and/or removing and/or adding metadata boxes around the page description boxes as appropriate. For example, one of the operations may result in changing the relationship between the boxes in the file. This may be as simple as changing pointers to shared data and/or other boxes.

The output of such a parser is either a regular JPM file or a JPM file with the metadata and shared data box structure described herein.

Metadata to Describe Page Attributes and Page Collections

In one embodiment, metadata is used to describe the attributes and the page collections. Attributes are the character of the page collections. For example, an attribute may indicate that a page collection is a thumbnail. The techniques described herein provide for multiple page descriptions that provide alternative representations for pages present in a JPM file. For example, page 1 might be a full resolution image of the first page, page 2 could be a thumbnail representation of the same page, and so on. The goal of metadata is two fold. First, the metadata describes pages and collections of pages that are in order, that is page 1, page 2, etc. Second, it describes how these pages are represented, e.g., full resolution, thumbnail, etc.

Figure 8:
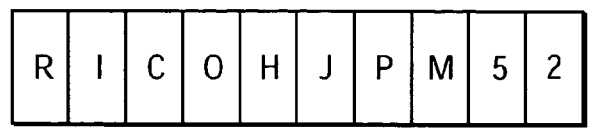
FIG. 8 illustrates an exemplary metadata for pages and page collection descriptions.
Figure 8:
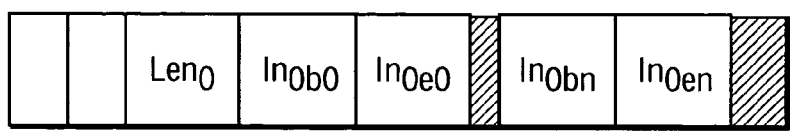
Figure 8:
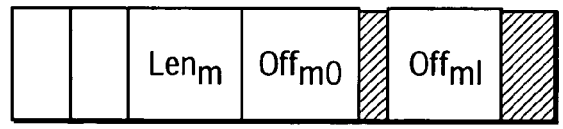
Figure 8:
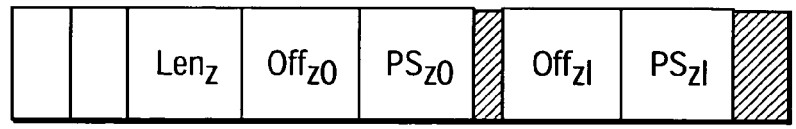

FIG. 8 illustrates exemplary metadata for page and page collection descriptions. Referring to FIG. 8, the metadata includes a header containing "RICOHJPM52". This header alerts the decoder that the following metadata signals that there are pages in this JPM file which uses a particular way of using shared data entry boxes to describe multiple pages.

Ranges of pages, or page collections, are also described below. For each range, there is a "Type" value in Table 2 that describes how the pages are described by the JPM file. Also for each range, there is a "Desc" value in Table 3 that shows whether page or page collection boxes are referred to, shows whether or not these page or page collection boxes are obscured in a Free boxes (as defined in part 6 of the JPEG 2000 standard), and shows whether the description is an index to the page or page collection boxes or an absolute offset pointer to them. These two fields are followed by a "Len" field that describes the length in bytes of the description of this range. Thus, it is possible to have several range descriptions in one metadata box.

TABLE 2

Type field for Page and
Page Collection Box Attribute Description Metadata

| Type | Meaning |
| --- | --- |
| 0 | Full image |
| 1 | Thumbnail |
| 2 | Monitor resolution |

TABLE 2-continued

Type field for Page and
Page Collection Box Attribute Description Metadata

| Type | Meaning |
| --- | --- |
| 3 | ROI |
| 4 | Low bit-rate, full resolution |
| 5 | Low bit rate, monitor resolution |
| 6 | Representative icon page |
| 7 | Text Only |
| 8 | Image Mask |
| 9 | Other |
| 10-255 | Reserved |

TABLE 3

Desc field for Page and Page Collection Box Description Metadata

| Description | Meaning |
| --- | --- |
| 0000 0xx0 | Page |
| 0000 0xx1 | Page Collection |
| 0000 0x0x | In JPM File Format |
| 0000 0x1x | In Free box |
| 0000 00xx | Indexed |
| 0000 01xx | Offset |
| 0000 11x0 | Offset, followed by page size |
| | All other values reserved |

Notice that the first run, noted by 0, describes the page or page collection boxes with a number, n, ranges of indexes each starting at b and ending at e. The next run, noted by m, describes page or page collection boxes with a series of offsets 0 through l. The last example shown, noted by z, shows page boxes described by offsets with the page size, PS, denoted. This is useful for responding to fixed or limited rate requests.

Storage for Metadata

The metadata is stored in metadata boxes. In one embodiment, from the JPM standard (Part 6), the box for this metadata is the Free box. To allow efficient parsing, it may be desirable to locate the metadata at the beginning of a JPM file. The metadata may be located immediately after the information that is required to be in the first part of a JPM file (to have the file still be considered a legal JPM file). In one embodiment, the metadata is in one of the assigned boxes, e.g., the Free box, and begins with a unique ASCII string such as, for example, RICOHJPM49. This is followed by the indexes, in binary, of each SDE box in the file. FIG. 5 shows an exemplary syntax. Referring to FIG. 5, the size of an SDE box index is two bytes. The information is included in a box, such as a Free box.

Since JPEG 2000 Part 6 does not set forth dedicated metadata boxes, other boxes are used. For example, from JPEG 2000 Annex Part 1, the Intellectual Property box, XML box, UUID box, and UUID Info box all allow user created data to be entered. Therefore, these may all be used for metadata that a decoder, configured and/or programmed to recognize it and act based on it.

Other boxes from JPEG 2000, Part 6 may also be used. Also possible are the Media Data Box and the Shared Data Entry Box.

Alternatively, the data may be hidden in the entropy coded codestream. There is a rich body of literature in hiding data in entropy coded codestream and specifically in JPEG 2000 and JBIG. Any of these techniques may be used. Furthermore, it may be possible to have extra data at the end of a shared data box, perhaps the final one for the codestream, that is not decoded by an entropy coder. This data would also be acceptable for metadata.

Parser

The goal of the parsing is to convert one JPM file to another JPM file. As described above, an image may be divided into parts, may be stored in various boxes, and metadata may be used to indicate the contents of the boxes, the image may be described in various pages and metadata may be used to indicate where the pages are in a JPM file. Once JPM file has been set up, a parser may be used to obtain the data that is desired.

In one embodiment, a parser is a program that takes as its input a JPM file and the desired characteristics of the output JPM file (resolution, bit-rate, region of interest, component, object layering, text vs. image, page, etc.) and creates a new JPM file with only the needed data. This is done without decoding or decompressing the various codestreams in the JPM file.

Figure 10:
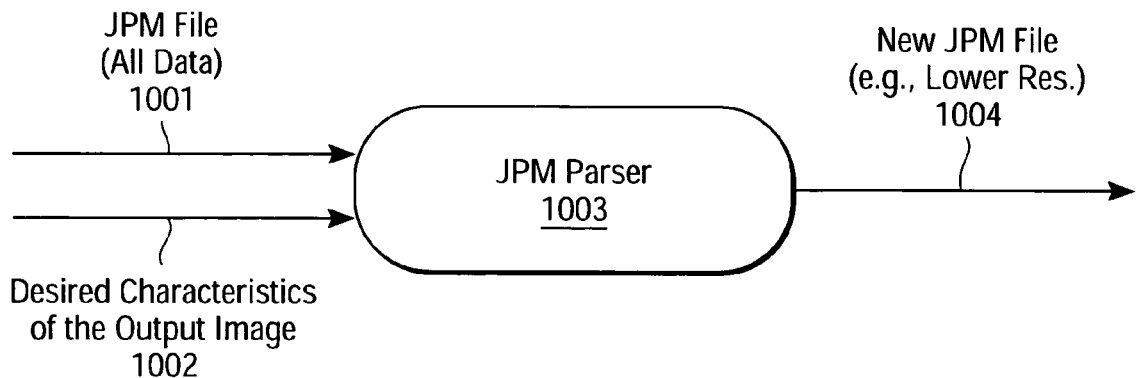
FIG. 10 illustrates parsing a JPM file.

The information used by a parser is from the available metadata, the JPM file boxes, and the codestream file formats and syntax. FIG. 10 shows an example of parsing. Referring to FIG. 10, a JPM file 1001 and an indication of the desired characteristics 1002 of an output image are input to JPM parser 1003, which generates a new JPM file 1004. JPM file 1004 may, for example, be a lower resolution version of JPM file 1001. Such a parser may be used to parse a JPM file with four pages to a JPM file with two pages.

In one embodiment, the parser is a generic parser that takes any JPM file (without the structure specified herein) and user desired output control specifying what the user wants. This input may be specified using a command line interface or application. Examples of user desired output control include specifying a resolution, bit-rate, area, component, pages, page collections (e.g., pages 1-4, 10 and 20-22). In response to these inputs, the parser parses the JPEG 2000 file or decodes all or part of the JPEG 2000 file and edits it (and subsequently re-encodes it). The parser may also edit boxes. The resulting output of the parser is a legal JPM codestream with the structure of shared data boxes and metadata described herein.

Parsing SDE Packed IPM Files

In another embodiment, the parser may be a SDE box parser that receives as in input a JPM file with the shared data box and metadata structure described herein along with user desired output control. Examples of user desired output control include specifying a resolution, bit-rate, area, component, pages, page collections (e.g., pages 1-4, 10 and 20-22), layout objects, an indication of whether objects are present or not, scale, location, and order. The operations performed by the parser may include reading metadata, editing one or more boxes, and skipping or removing one or more shared data boxes or other boxes based on the specified operation. The output is a JPM file with or without the shared data box and metadata structure described herein.

Parsing Page Descriptions

Note that the shared data box parser and the generic parser may be the same parser. This is also the case for the page description parser described in more detail below. The advantage of the SDE boxes with metadata parsing is that it is much quicker and requires no understanding of the JPEG 2000 codestream.

Consolidator

Figure 16:
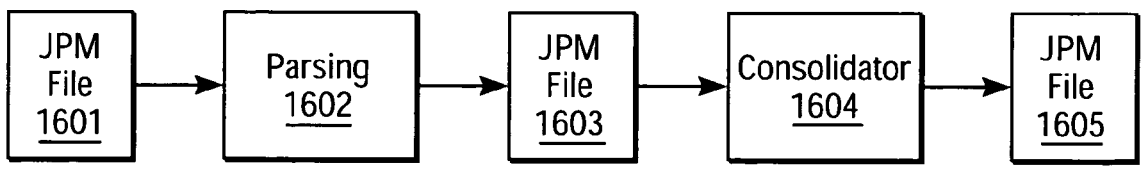
FIG. 16 illustrates a flow diagram of the use of a consolidator after parsing a JPM file.

In one embodiment, after parsing, a smaller or minimum sized JPM file may be created. FIG. 16 illustrates such a function where a JPM file 1601 undergoes parsing by parser 1602 to create JPM file 1603. The parsing may be performed to create a JPM file for a specific purpose (e.g., resolution, region of interest, etc.). The consolidator 1604 receives JPM file 1603 and removes data in JPM file 1603 that is no longer needed for the specific purpose for which parser 1602 parsed JPM file 1601.

AN EXAMPLE

An SDE Parsing Example

In this example, an RGB color image is split into an object mask and an object image using a segmentor. The full size object mask is divided into six tiles. These object masks are compressed at full size, down sampled and compressed at ¼ size and twice downsized and compressed at ⅛ size. Thus, there are 18 (6 tile×3 resolutions) independent object mask codestreams.

There is no requirement when a object mask is downsampled and compressed at multiple resolutions that it be split into the same number of layout objects at each resolution. There is some advantage to splitting it into the same tiles as a JPEG 2000 image used in the image part, but there is an advantage to using fewer layout objects at low resolution. Each layout object has some amount of overhead, and the overhead for 6 "tiles" on a page may not be much at high resolution, but at ⅛th resolution the overhead is much higher. Thus at ⅛th resolution it may make sense to use only one layout object for the entire object mask.

The full size background contone image is compressed with a JPEG 2000 encoder once with settings of six tiles and three resolution levels. Thus, there is the possibility of accessing only the background data needed to correspond to any of the 18 foreground object mask codestreams.

For example, a background contone image of the JPEG 2000 test image cmpnd1 of 768×512 RGB color image is compressed with a JPEG 2000 encoder for tile_number=6, resolution_number=3, layer_number=2, component_number=3, precinct_number=1.

Assuming only one precinct per tile, T2R0L0C0 indicates Tile 2, Resolution 0, Layer 0, Component 0. The "packet=2437" means the packet size is 2437 bytes. For resolution progression, the main and tile headers for the full size, half size and quarter size images are made available. The main and tile headers for a 1-layer image and 1-component image are also made available.

Because SDE boxes are used to store all pieces of codestream, the same data may be reused as many times as needed without redundantly repeating the data. In the actual place where the data is needed to be present, a pointer is used to refer to the data stored in a particular SDE box specified with a unique ID. For region progressive feature by tiling, Tile 2 out of 6 tiles is selected. The following data is for Tile 2 only.

For resolution progression in Table 4, three resolutions for Tile 2 are demonstrated. The quarter size Tile 2 includes Resolution 0 data in the first column. The half size Tile 2 contains Resolution 0 and Resolution 1 data as shown in the second column. The full size Tile 2 comprises data in all resolutions.

TABLE 4

Example 1: Resolution progression packet size and index for the SDE Box

| | Packet size in bytes | | | SDE Box index |
|---|---|---|---|---|
| | Quarter size | Half size | Full size | |
| T2R0L0C0 | 2437 | 2437 | 2437 | 36 |
| -C1 | 1723 | 1723 | 1723 | 37 |
| -C2 | 1575 | 1575 | 1575 | 38 |
| T2R0L1C0 | 464 | 464 | 464 | 39 |
| -C1 | 433 | 433 | 433 | 40 |
| -C2 | 424 | 424 | 424 | 41 |
| T2R1L0C0 | — | 5510 | 5510 | 42 |
| -C1 | — | 4341 | 4341 | 43 |
| -C2 | — | 3703 | 3703 | 44 |
| T2R1L1C0 | — | 1409 | 1409 | 45 |
| -C1 | — | 1440 | 1440 | 46 |
| -C2 | — | 1483 | 1483 | 47 |
| T2R2L0C0 | — | — | 16,639 | 48 |
| -C1 | — | — | 13,978 | 49 |
| -C2 | — | — | 11,617 | 50 |
| T2R2L1C0 | — | — | 5892 | 51 |
| -C1 | — | — | 5819 | 52 |
| -C2 | — | — | 5862 | 53 |

For quality progression in Table 5, two layers of quality in Tile 2 are shown. In this example, the Layer 0 quality codestream contains data in the first column. The higher quality codestream includes more data as shown in the second column.

TABLE 5

Example 2: Quality progression packet size and index for the SDE Box

| | Packet size in bytes | | SDE Box index |
|---|---|---|---|
| | Lossy | Lossless | |
| T2R0L0C0 | 2437 | 2437 | 36 |
| -C1 | 1723 | 1723 | 37 |
| -C2 | 1575 | 1575 | 38 |
| T2R1L0C0 | 5510 | 5510 | 42 |
| -C1 | 4341 | 4341 | 43 |
| -C2 | 3703 | 3703 | 44 |
| T2R2L0C0 | 16,639 | 16,639 | 48 |
| -C1 | 13,978 | 13,978 | 49 |
| -C2 | 11,617 | 11,617 | 50 |
| T2R0L1C0 | — | 464 | 39 |
| -C1 | — | 433 | 40 |
| -C2 | — | 424 | 41 |
| T2R1L1C0 | — | 1409 | 45 |
| -C1 | — | 1440 | 46 |
| -C2 | — | 1483 | 47 |
| T2R2L1C0 | — | 5892 | 51 |
| -C1 | — | 5819 | 52 |
| -C2 | — | 5862 | 53 |

For progression by component in Table 6, a grayscale version of Tile 2 is shown. This codestream includes data for Component 0 only.

TABLE 6

Example 3: Component 0 Packet Size and Index for the SDE Box

| | Packet size in bytes | | SDE Box index |
|---|---|---|---|
| | Lossy | Lossless | |
| T2R0L0C0 | 2437 | 2437 | 36 |
| T2R1L0C0 | 5510 | 5510 | 42 |
| T2R2L0C0 | 16,639 | 16,639 | 48 |
| T2R0L1C0 | — | 464 | 39 |
| T2R1L1C0 | — | 1409 | 45 |
| T2R2L1C0 | — | 5892 | 51 |

Figure 9:
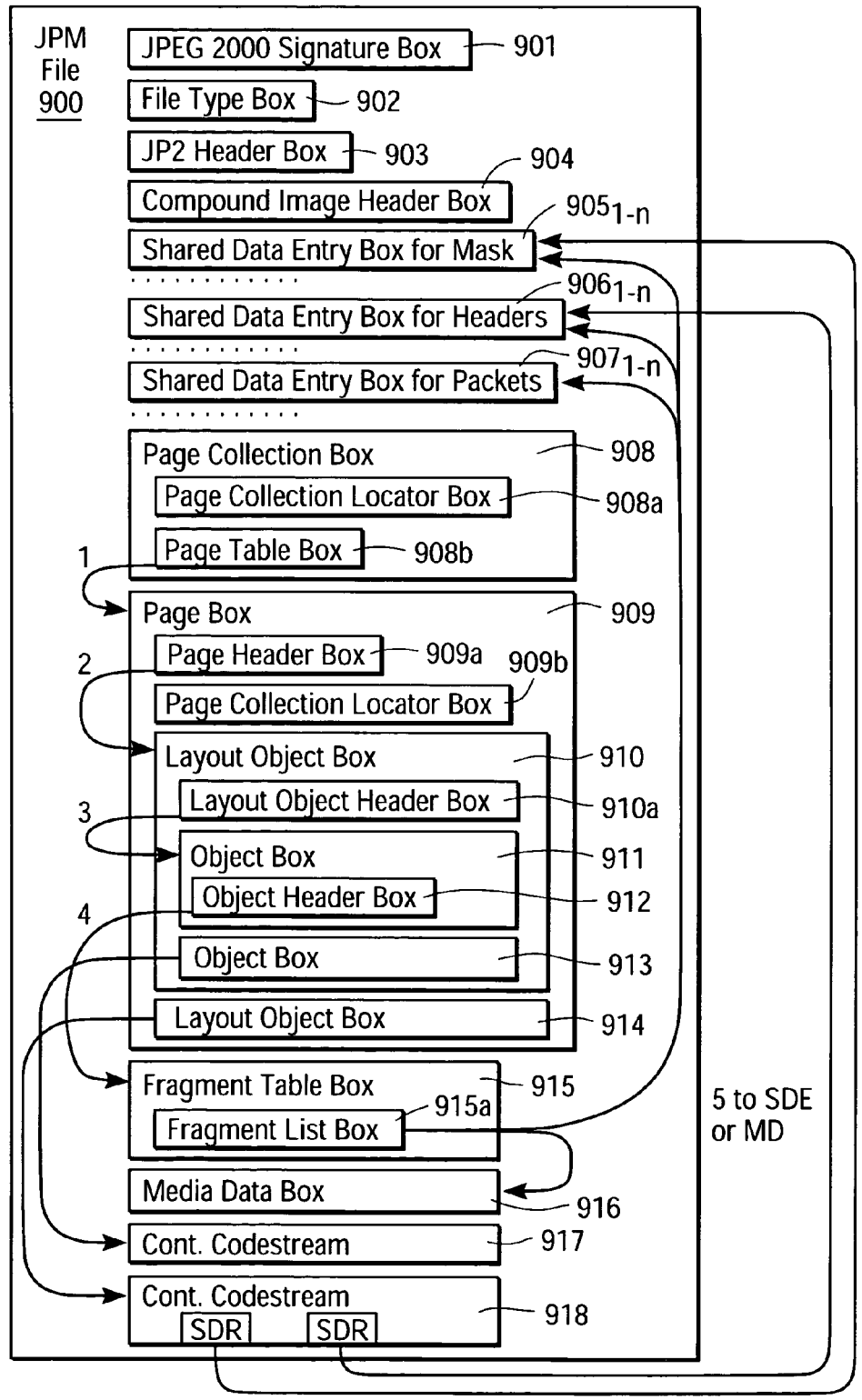
FIG. 9 illustrates an example of pointers in a JPM file.

FIG. 9 is an example of a JPM file box structure using pointers to describe a page. Referring to FIG. 9, JPM file 900 includes JPEG 2000 Signature box 901, File Type box 902, JP2 Header box 903, Compound Image Header box 904, one or more Shared Data Entry boxes for object mask $905_{1-n}$, one or more Shared Data Entry boxes for headers $906_{1-n}$, one or more Shared Data Entry boxes fro packets $907_{1-n}$, a Page Collection box 908 that contains a Page Collection Locator Box 908A and a Page Table box 908B, a Page Box 909 that includes a Page Header box 909A, a Page Collection Locator box 909B, and one or more Layout Object boxes, such as Layout Object box 910 that contains Layout Object Header box 910A and one or more Object boxes such as Object box 911, which may contain Object Header box 912, and Object box 913, and Layout object box 914. JPM file 900 also includes a Fragment Table box 915, which has a Fragment List box 915A, a Media Data box 916, a Contiguous Codestream boxes 917 and 918. Contiguous Codestream box 918 includes a pair of Shared Data Reference (SDR) boxes.

Page boxes, such as Page box 909, points to the Layout Object boxes, such as Layout Object box 910. Layout Object boxes, such as Layout Object box 910, points into the Fragment Table box, such as Fragment Table box 915. The Fragment Table box, such as Fragment Table box 915, points to either the SDE Boxes or the Media Data Boxes. In FIG. 9, Fragment List box 915A or Fragment Table box 915 points to Media Data box 916 and one or more SDE boxes for the object mask, headers and packets. Object box 913 points to Contiguous Codestream box 917. Layout Object box 913 points to Contiguous Codestream box 918, which includes two Shared Data Reference boxes that point to SDEs for the object mask and headers, in this example.

Figure 14A:
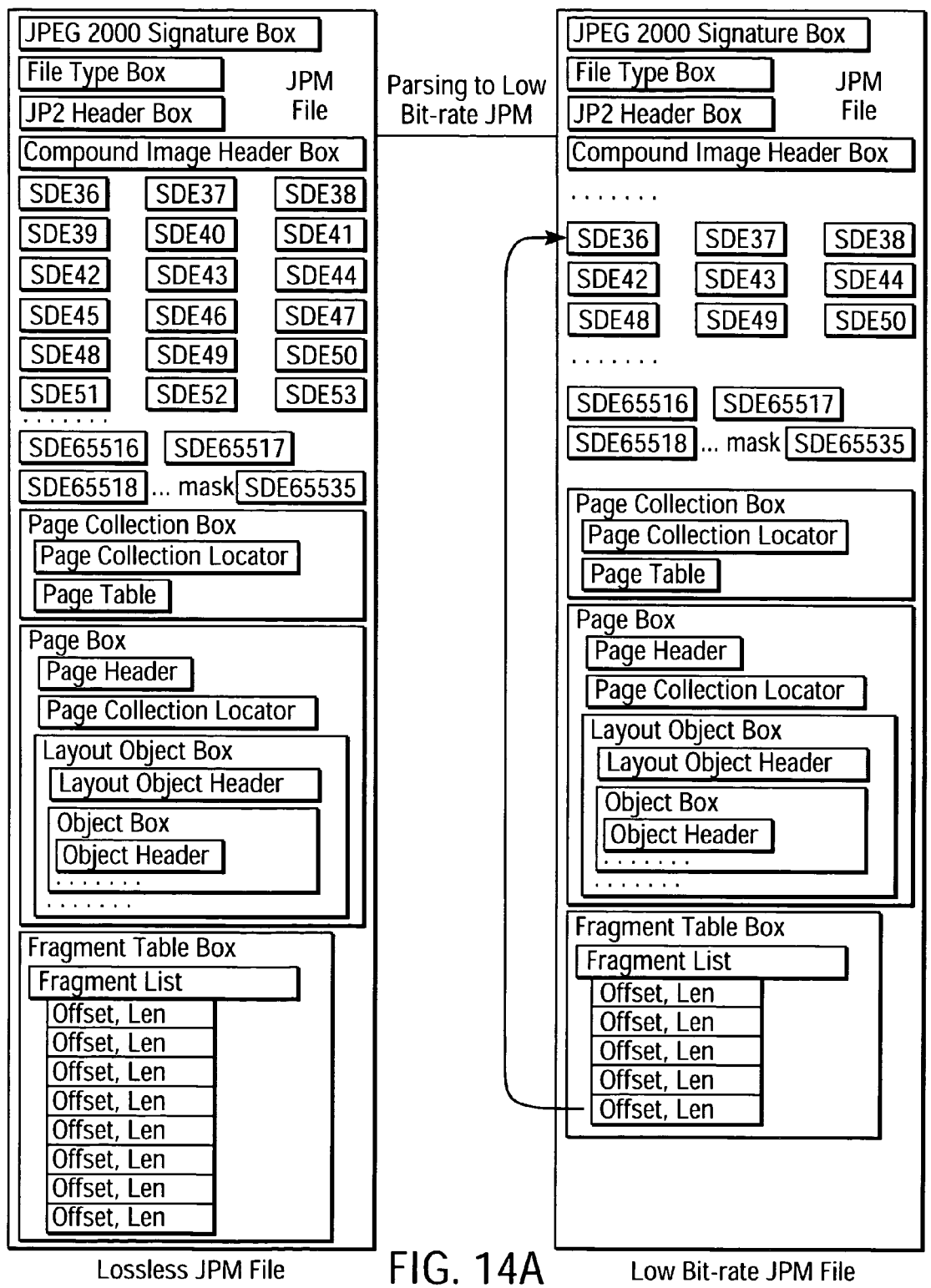
FIG. 14A is an example that shows parsing a lossless JPM file to a low bit-rate JPM file.

FIG. 14A shows an example of a parser taking a full resolution lossless JPM file and creating a full resolution lossy JPM file. The parser understands the contents of the SDE boxes either by the indexes or the metadata boxes that describe the contents or both. The SDE boxes containing the full resolution object masks and full resolution first layer packets for the images are selected for the new file. The Fragment Table box is edited to point to the new SDE box locations.

PAGE DESCRIPTION EXAMPLE

Figure 14B:
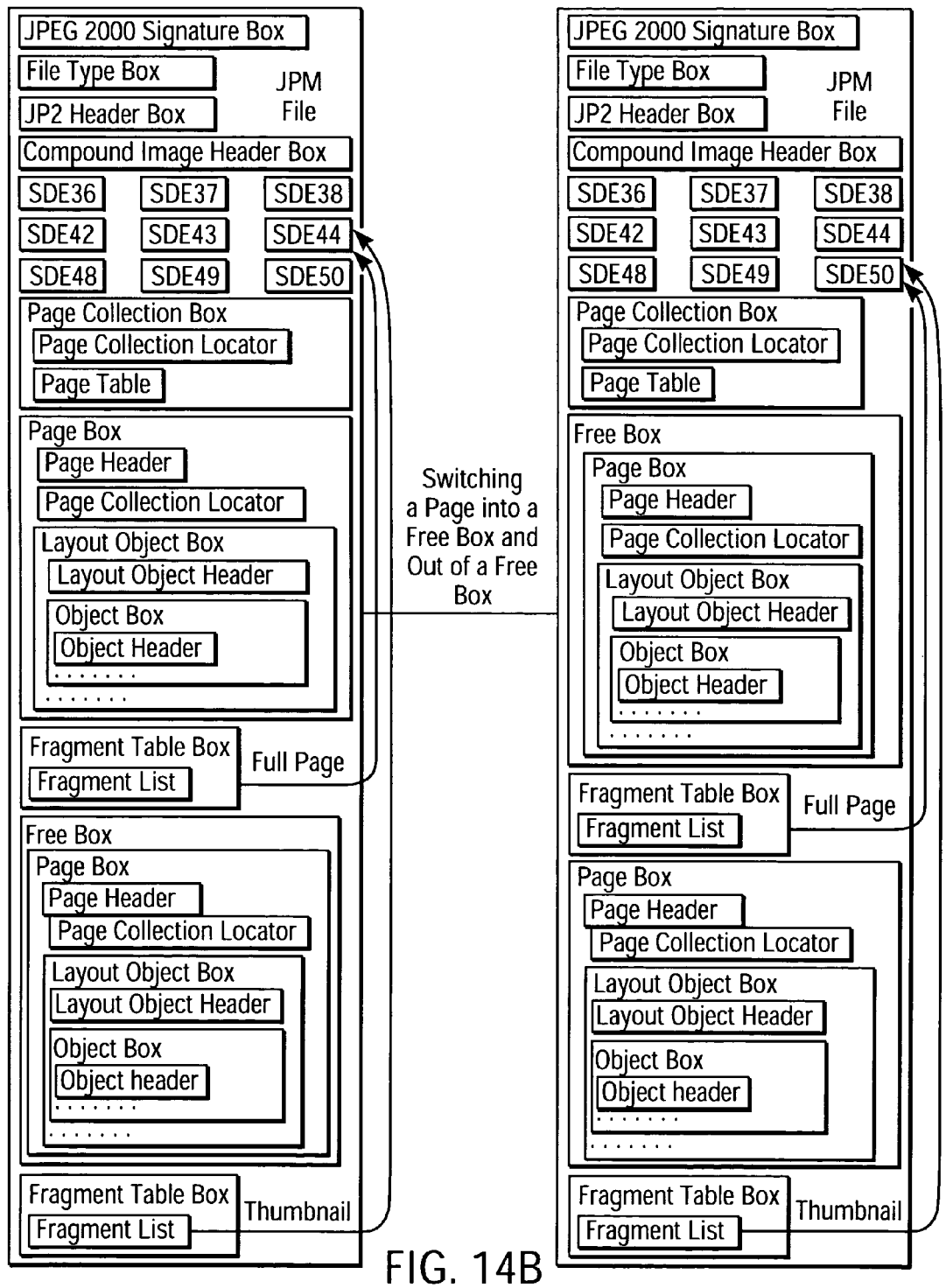
FIG. 14B is an example showing a parser switching a page into a free box and out of a free box.

FIG. 14B shows a JPM with two Page boxes. One of them is encapsulated in a Free box making it unusable for a generic decoder. The parser finds the Page box of interest, frees it from the Free box by removing the box header and encapsulates the other Page box in the Free box. Thus, the generic decoder now decodes the other Page box instead of the original.

Figure 14C:
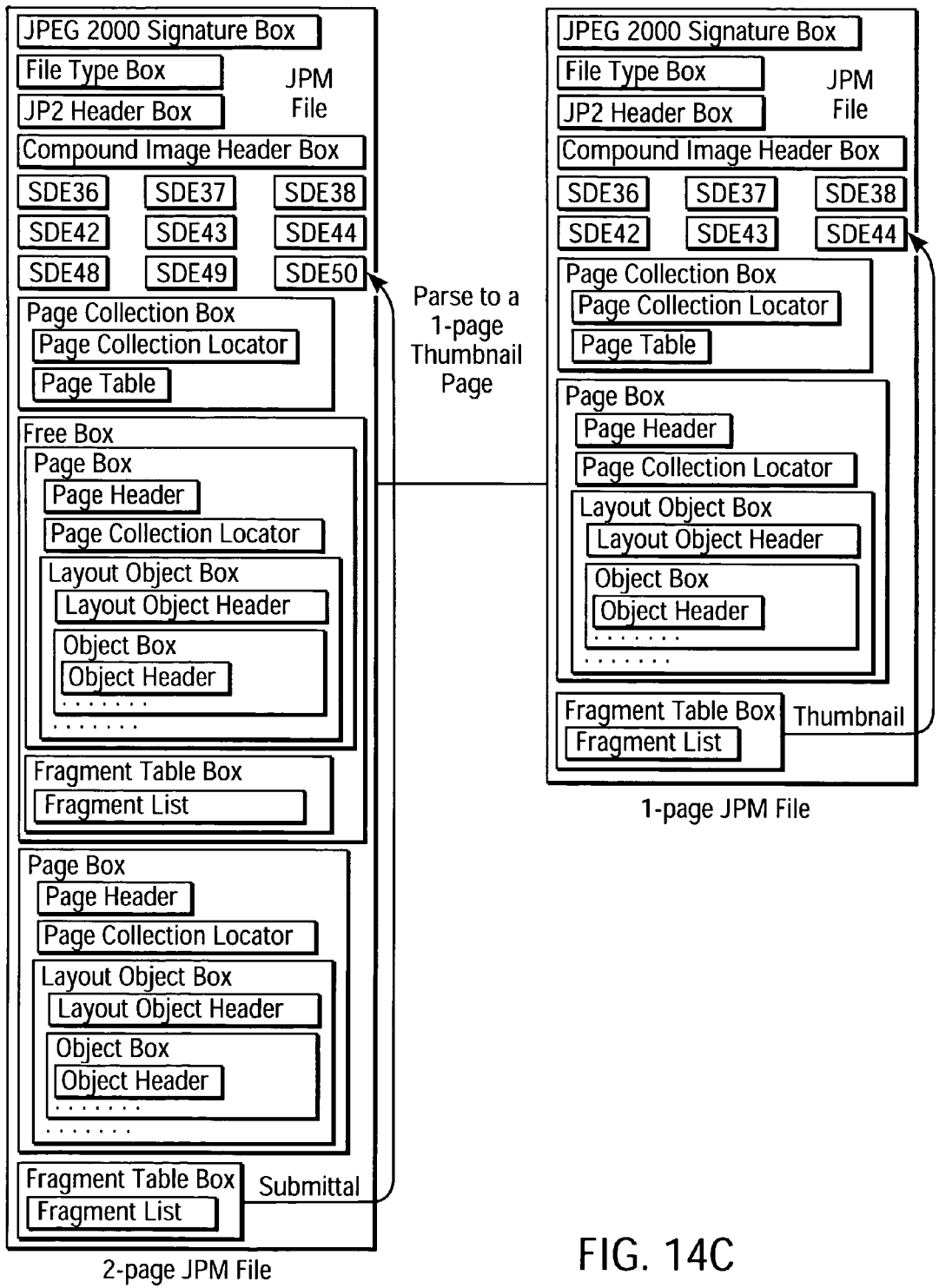
FIG. 14C illustrates a parser parsing a 2-page JPM file to a 1-page JPM file.

FIG. 14C shows the same file as on the right side of FIG. 14B. Now the file is consolidated to its minimum form by removing all the unnecessary SDE and Page boxes and rewriting all the pointers appropriately.

The access features of JPEG 2000 can be preserved with the JPM format even if the object masks are compressed with older coding standards. The cost for this is fairly reasonable in terms of bits and the coding gain over JPEG 2000 is preserved. The Shared Data Box architecture of JPM makes access of both the mask and JPEG 2000 coded image codestreams straight forward.

An Exemplary Computer System

Figure 15:
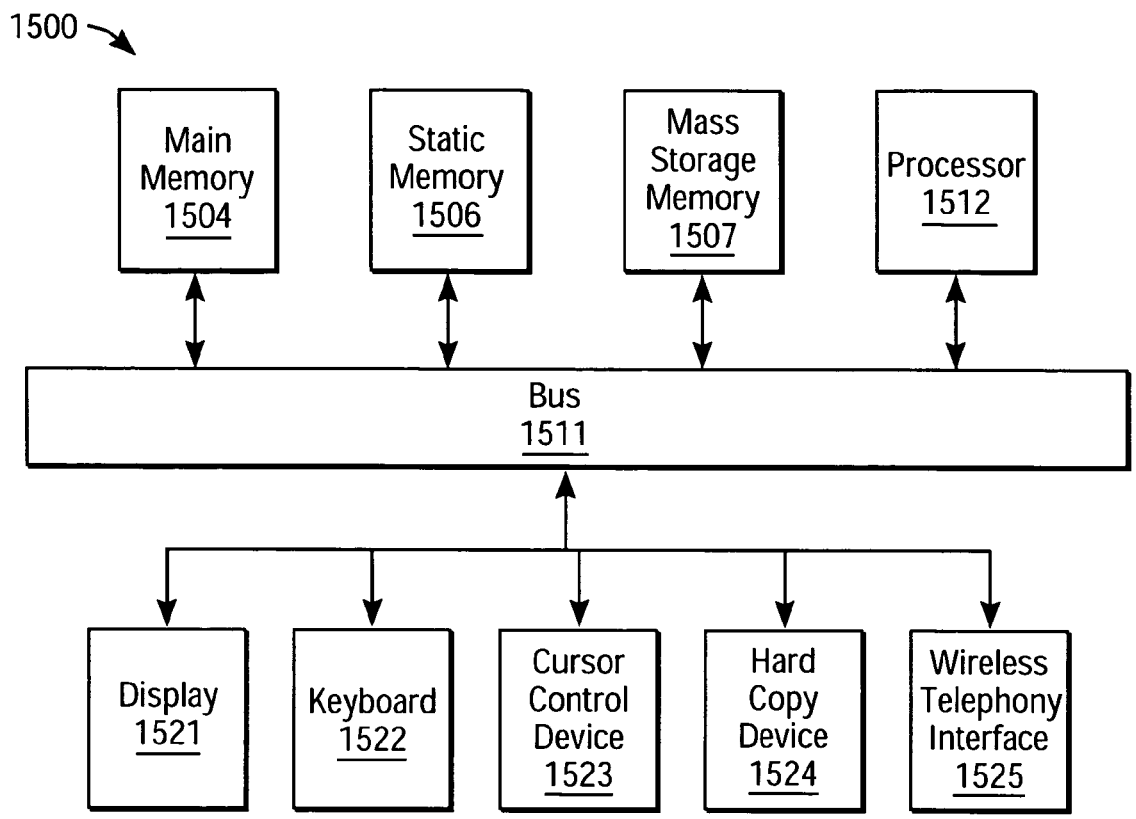
FIG. 15 is a block design of a computer system.

FIG. 15 is a block diagram of an exemplary computer system that may perform one or more of the operations described herein. Referring to FIG. 15, computer system 1500 may comprise an exemplary client 1550 or server 1500 computer system. Computer system 1500 comprises a communication mechanism or bus 1511 for communicating information, and a processor 1512 coupled with bus 1511 for processing information. Processor 1512 includes a microprocessor, but is not limited to a microprocessor, such as, for example, Pentium™, PowerPC™, Alpha™, etc.

System 1500 further comprises a random access memory (RAM), or other dynamic storage device 1504 (referred to as main memory) coupled to bus 1511 for storing information and instructions to be executed by processor 1512. Main memory 1504 also may be used for storing temporary variables or other intermediate information during execution of instructions by processor 1512.

Computer system 1500 also comprises a read only memory (ROM) and/or other static storage device 1506 coupled to bus 1511 for storing static information and instructions for processor 1512, and a data storage device 1507, such as a magnetic disk or optical disk and its corresponding disk drive. Data storage device 1507 is coupled to bus 1511 for storing information and instructions.

Computer system 1500 may further be coupled to a display device 1521, such as a cathode ray tube (CRT) or liquid crystal display (LCD), coupled to bus 1511 for displaying information to a computer user. An alphanumeric input device 1522, including alphanumeric and other keys, may also be coupled to bus 1511 for communicating information and command selections to processor 1512. An additional user input device is cursor control 1523, such as a mouse, trackball, trackpad, stylus, or cursor direction keys, coupled to bus 1511 for communicating direction information and command selections to processor 1512, and for controlling cursor movement on display 1521.

Another device that may be coupled to bus 1511 is hard copy device 1524, which may be used for printing instructions, data, or other information on a medium such as paper, film, or similar types of media. Furthermore, a sound recording and playback device, such as a speaker and/or microphone may optionally be coupled to bus 1511 for audio interfacing with computer system 1500. Another device that may be coupled to bus 1511 is a wired/wireless communication capability 1525 to communication to a phone or handheld palm device.

Note that any or all of the components of system 1500 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
receiving a file in a file format, wherein the file has a plurality of page boxes for a page, each of the plurality of page boxes corresponding to a different description of the page, wherein the page is a single page and each page box and corresponding different description provide a different visual representation of the single page; and
accessing the file with a processing core to obtain at least one page box and corresponding different description of the page.

2. The method defined in claim 1 wherein at least one of the plurality of page boxes stores one description of the page.

3. The method defined in claim 1 wherein at least one of the plurality of page boxes points to another file that stores one description of the page.

4. The method defined in claim 1 wherein the different page boxes are located anywhere in the file.

5. The method defined in claim 1 wherein the file is a JPM file.

6. The method defined in claim 1 wherein the plurality of page boxes include a plurality of page descriptions for a plurality of pages, and further comprising sorting the plurality of page descriptions.

7. The method defined in claim 6 wherein sorting the plurality of page descriptions comprises creating a collection of page boxes corresponding to different page attributes for the same page.

8. The method defined in claim 7 wherein sorting the plurality of page descriptions is performed by an encoder.

9. The method defined in claim 7 wherein the file includes metadata to describe the attributes and the collection.

10. The method defined in claim 9 wherein the metadata includes a header to signal a decoder that the file includes multiple pages.

11. The method defined in claim 9 wherein the metadata includes one or more of a type field to describe the type of the one or more pages, a description field to include information to describe the one or more pages, and a length field to describe the length of each of the one or more pages.

12. The method defined in claim 6 wherein sorting the plurality of page descriptions comprises creating a collection of page boxes corresponding to one page attribute for each of the plurality of pages.

13. The method defined in claim 12 wherein the file includes metadata to describe the attributes and the collection.

14. The method defined in claim 13 wherein the metadata includes a header to signal a decoder that the file includes multiple pages.

15. The method defined in claim 13 wherein the metadata includes one or more of a type field to describe the type of the one or more pages, a description field to include information to describe the one or more pages, and a length field to describe the length of each of the one or more pages.

16. The method defined in claim 6 further comprising decoding at least one of the different descriptions of the page without decoding other descriptions of the page in the file.

17. The method defined in claim 1 wherein the page boxes refer to shared data entry boxes.

18. The method defined in claim 17 wherein each of the shared data entry boxes contains data of an object for a page.

19. A computer readable storage medium having instructions stored thereon which, when executed by a system, cause the system to:

receive a file in a file format, wherein the file has a plurality of page boxes for a page, each of the plurality of page boxes corresponding to a different description of the page, wherein the page is a single page and each page box and corresponding different description provide a different visual representation of the single page; and access the file to obtain at least one page box and corresponding different description of the page.

20. The computer readable storage medium defined in claim 19 wherein at least one of the plurality of page boxes stores one description of the page.

21. The computer readable storage medium defined in claim 19 wherein at least one of the plurality of page boxes points to another file that stores one description of the page.

22. The computer readable storage medium defined in claim 19 wherein the different page boxes are located anywhere in the file.

23. The computer readable storage medium defined in claim 19 wherein the file is a JPM file.

24. The article of manufacture defined in claim 19 wherein the plurality of page boxes include a plurality of page descriptions for a plurality of pages, and further comprising sorting the plurality of page descriptions.

25. The computer readable storage medium defined in claim 24 wherein sorting the plurality of page descriptions comprises creating a collection of page boxes corresponding to different page attributes for the same page.

26. The computer readable storage medium defined in claim 25 wherein the file includes metadata to describe the attributes and the collection.

27. The computer readable storage medium defined in claim 26 wherein the metadata includes a header to signal a decoder that the file includes multiple pages.

28. The computer readable storage medium defined in claim 26 wherein the metadata includes one or more of a type field to describe the type of the one or more pages, a description field to include information to describe the one or more pages, and a length field to describe the length of each of the one or more pages.

29. The computer readable storage medium defined in claim 24 wherein instructions to sort the plurality of page descriptions comprise instructions which, when executed by the system, cause the system to create a collection of page boxes corresponding to one page attribute for each of the plurality of pages.

30. The computer readable storage medium defined in claim 29 wherein the file includes metadata to describe the attributes and the collection.

31. The computer readable storage medium defined in claim 30 wherein the metadata includes a header to signal a decoder that the file includes multiple pages.

32. The computer readable storage medium defined in claim 31 wherein the metadata includes one or more of a type field to describe the type of the one or more pages, a description field to include information to describe the one or more pages, and a length field to describe the length of each of the one or more pages.

33. The computer readable storage medium defined in claim 24 further comprising instructions which, when executed by the system, cause the system to decode at least one of the different descriptions of the page without decoding other descriptions of the page in the file.

34. The computer readable storage medium defined in claim 19 wherein the page boxes refer to shared data entry boxes.

35. The computer readable storage medium defined in claim 34 wherein each of the shared data entry boxes contains data of an object for a page.

36. An apparatus comprising:
means for receiving a file in a file format, wherein the file has a plurality of page boxes for a page, each of the plurality of page boxes corresponding to a different description of the page, wherein the page is a single page and each page box and corresponding different description provide a different visual representation of the single page; and means for accessing the file with a processing core to obtain at least one page box and corresponding different description of the page.

37. The apparatus defined in claim 36 wherein at least one of the plurality of page boxes stores one description of the page.

38. The apparatus defined in claim 36 wherein at least one of the plurality of page boxes points to another file that stores one description of the page.

39. The apparatus defined in claim 36 wherein the different page boxes are located anywhere in the file.

40. The apparatus defined in claim 36 wherein the file is a JPM file.

41. The apparatus defined in claim 36 wherein the plurality of page boxes include a plurality of page descriptions for a plurality of pages, and further comprising means for sorting the plurality of page descriptions.

42. The apparatus defined in claim 41 wherein the means for sorting the plurality of page descriptions comprises means for creating a collection of page boxes corresponding to different page attributes for the same page.

43. The apparatus defined in claim 42 wherein the file includes metadata to describe the attributes and the collection.

44. The apparatus defined in claim 43 wherein the metadata includes a header to signal a decoder that the file includes multiple pages.

45. The apparatus defined in claim 43 wherein the metadata includes one or more of a type field to describe the type of the one or more pages, a description field to include information to describe the one or more pages, and a length field to describe the length of each of the one or more pages.

46. The apparatus defined in claim 41 wherein the means for sorting the plurality of page descriptions comprises means for creating a collection of page boxes corresponding to one page attribute for each of the plurality of pages.

47. The apparatus defined in claim 46 wherein the file includes metadata to describe the attributes and the collection.

48. The apparatus defined in claim 47 wherein the metadata includes a header to signal a decoder that the file includes multiple pages.

49. The apparatus defined in claim 47 wherein the metadata includes one or more of a type field to describe the type of the one or more pages, a description field to include information to describe the one or more pages, and a length field to describe the length of each of the one or more pages.

50. The apparatus defined in claim 41 further comprising means for decoding at least one of the different descriptions of the page without decoding other descriptions of the page in the file.

51. The apparatus defined in claim 36 wherein the page boxes refer to shared data entry boxes.

52. The apparatus defined in claim 51 wherein each of the shared data entry boxes contains data of an object for a page.

53. An apparatus comprising:
   an input to receive a file in a file format, wherein the file has a plurality of page boxes for a page, each of the plurality of page boxes corresponding to a different description of the page, wherein the page is a single page and each page box and corresponding different description provide a different visual representation of the single page; and
   a processing core to access the file to obtain at least one page box and corresponding different description of the page.

54. The apparatus defined in claim 53 wherein at least one of the plurality of page boxes stores one description of the page.

55. The apparatus defined in claim 53 wherein at least one of the plurality of page boxes points to another file that stores one description of the page.

56. The apparatus defined in claim 53 wherein the different page boxes are located anywhere in the file.

57. The apparatus defined in claim 53 wherein the file is a JPM file.

\* \* \* \* \*